United States Patent
Maruyama

(10) Patent No.: US 11,165,924 B2
(45) Date of Patent: Nov. 2, 2021

(54) IMAGE PROCESSING APPARATUS HAVING FUNCTIONS INCLUDING SCAN FUNCTION, CONTROL METHOD THEREOF, AND STORAGE MEDIUM STORING PROGRAM FOR EXECUTING CONTROL METHOD

(71) Applicant: CANON KABUSHIKI KAISHA, Tokyo (JP)

(72) Inventor: Naoki Maruyama, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/953,497

(22) Filed: Nov. 20, 2020

(65) Prior Publication Data
US 2021/0195047 A1 Jun. 24, 2021

(30) Foreign Application Priority Data
Dec. 19, 2019 (JP) .............................. JP2019-229369

(51) Int. Cl.
G06F 3/12 (2006.01)
H04N 1/00 (2006.01)
H04N 1/047 (2006.01)

(52) U.S. Cl.
CPC ......... *H04N 1/00931* (2013.01); *H04N 1/047* (2013.01); *H04N 2201/0094* (2013.01)

(58) Field of Classification Search
CPC .......... H04N 1/00931; H04N 1/32683; H04N 1/047; H04N 2201/0094; H04N 2201/04756

USPC .................................................. 358/1.1–1.18
See application file for complete search history.

(56) References Cited

U.S. PATENT DOCUMENTS

| 2001/0012132 A1* | 8/2001 | Kaji | ................... H04N 1/00795 |
| | | | 358/474 |
| 2013/0002781 A1* | 1/2013 | Kamijo | .............. G03G 15/5029 |
| | | | 347/118 |
| 2014/0168730 A1* | 6/2014 | Nakamura | ............. H04N 1/047 |
| | | | 358/498 |
| 2015/0358503 A1* | 12/2015 | Hirao | ................... H04N 1/0443 |
| | | | 358/474 |

(Continued)

FOREIGN PATENT DOCUMENTS

JP 2013153521 A 8/2013

*Primary Examiner* — Gabriel I Garcia
(74) *Attorney, Agent, or Firm* — Rossi, Kimms & McDowell LLP

(57) ABSTRACT

An image processing apparatus that is capable of executing a scan image process and another image process in parallel without reducing a scanning speed. A scanner scans an image of a document and generates image data. An image processor applies an image process to image data. A scanner controller transfers image data to the image processor from the scanner through a data bus. A controller determines whether a first image process applied to the scanned image data is executed in parallel with a second image process and determines whether a setting about the first image process is a predetermined setting. The controller sets a transfer speed to a first speed when the image processes are not executed in parallel and sets the transfer speed to a lower second speed when the image processes are executed in parallel and when the setting about the first image process is the predetermined setting.

9 Claims, 24 Drawing Sheets

(56) References Cited

U.S. PATENT DOCUMENTS

2018/0314668 A1\* 11/2018 Kawamoto ........ H04N 1/00095
2021/0044714 A1\* 2/2021 Shinohara ................ H04N 1/17

\* cited by examiner

FIG. 13A

| JOB | COPY | SEND | FAX TRANSMISSION | PDL | BOX | PULLSCAN |
|---|---|---|---|---|---|---|
| IMAGE PROCESS 1 | SCAN | SCAN | SCAN | RIP | SCAN | SCAN |
| IMAGE PROCESS 2 | PRINT | IMAGING | FAX | PRINT | | |

FIG. 13B

| FOLLOWING JOB | PRECEDING JOB | | | | | |
|---|---|---|---|---|---|---|
| | COPY | BOX | PULLSCAN | PDL | SEND | FAX TRANSMISSION |
| COPY | – | × | × | ○ | ○ | ○ |
| BOX | ○ | – | × | ○ | ○ | ○ |
| PULLSCAN | ○ | × | – | ○ | ○ | ○ |
| PDL | ○ | ○ | ○ | – | ○ | ○ |
| SEND | ○ | × | × | ○ | – | ○ |
| FAX TRANSMISSION | ○ | × | × | ○ | ○ | – |

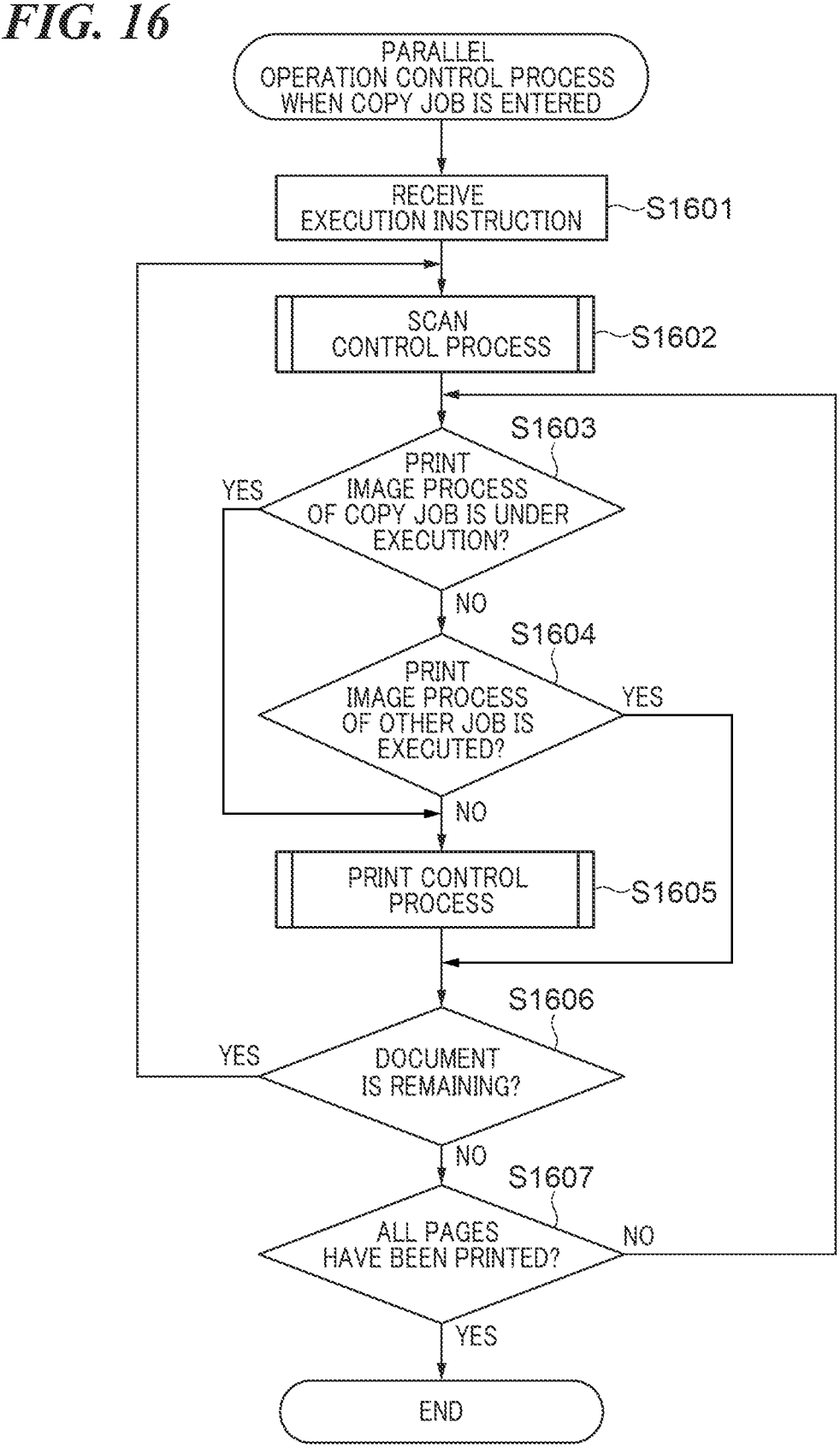

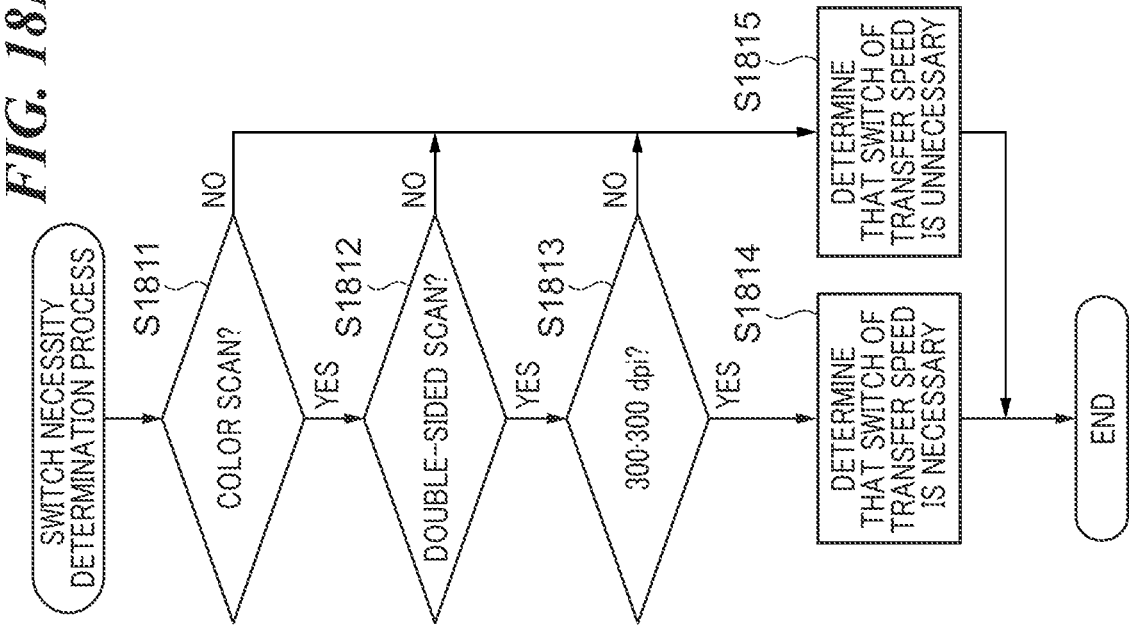
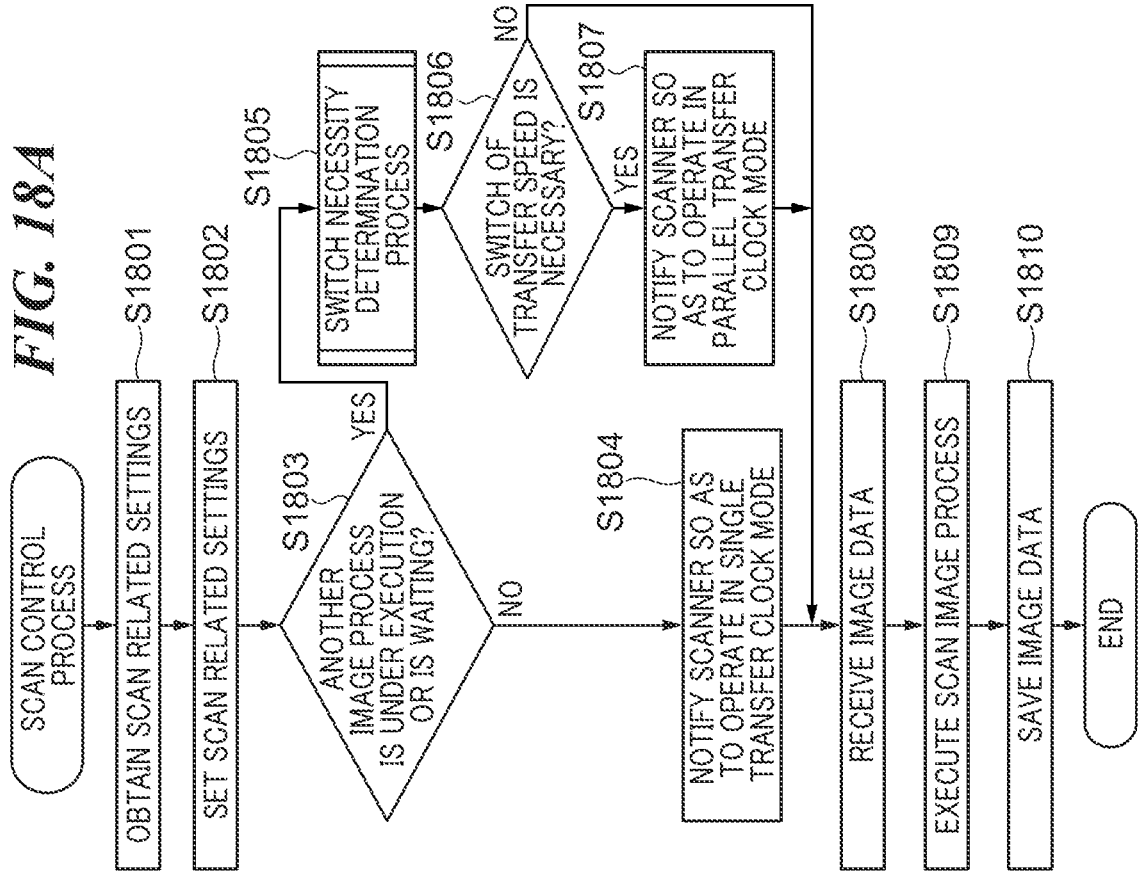

*FIG. 19*

| SCAN COLOR | SCAN SIDE | SCAN RESOLUTION | SWITCH OF TRANSFER SPEED |
|---|---|---|---|
| COLOR | DOUBLE-SIDED | 300·300 dpi | NECESSARY |
| | | OTHER | UNNECESSARY |
| | SINGLE-SIDED | – | |
| MONOCHROME | – | – | |

*FIG. 21*

| JOB TYPE | SEND | PULLSCAN | COPY | BOX | FAX TRANSMISSION |
|---|---|---|---|---|---|
| SWITCH DETERMINATION | NECESSARY | | UNNECESSARY | | |

# IMAGE PROCESSING APPARATUS HAVING FUNCTIONS INCLUDING SCAN FUNCTION, CONTROL METHOD THEREOF, AND STORAGE MEDIUM STORING PROGRAM FOR EXECUTING CONTROL METHOD

BACKGROUND OF THE INVENTION

Field of the Invention

The present invention relates to an image processing apparatus having functions including a scan function, a control method therefor, and a storage medium storing a program for executing the control method.

Description of the Related Art

An MFP is known as an image processing apparatus having functions, such as a scan function and a print function. In the MFP, a scanner scans a document at a scanning speed set by a user and transfers image data of the scanned document to the image processor in accordance with an image transfer clock of a predetermined frequency. The image processor applies an image process to the received image data, stores the processed image data in a main memory of the MFP temporarily, and obtains processed image data from the main memory when another image process is applied to the processed image data. In the MFP, the scanner, image processor, and main memory transfer data through one image bus. In recent years, an MFP that is achievable of high-speed scan is developed. When the MFP executes a high-speed scan job, a data transfer amount in the image bus per unit time increases as compared with a case of executing a normal-speed scan job. Moreover, in the MFP, the image processor executes an image process about PDL data that is printed by a printer. The printer and the image processor transfer data through the above-mentioned image bus.

The MFP may execute a scan job in parallel with a print job when execution of the print job is designated during execution of the scan job. In this case, the scanner, printer, image processor, and main memory transfer data in parallel through the image bus, which congests the image bus. Furthermore, when the high-speed scan job is performed, the data transfer amount through the image bus per unit time will become huge and may exceed a transferable upper limit value of the image bus. When the data transfer amount through the image bus exceeds the transferable upper limit value, the data transfer through the image bus becomes impossible and the execution of the scan job and the print job will stop. In light of this problem, the MFP that reduces the scanning speed of the scan job to control the data transfer amount through the image bus per unit time is proposed (for example, see Japanese Laid-Open Patent Publication (Kokai) No. 2013-153521 (JP 2013-153521A)).

However, since the conventional MFP reduces the scanning speed of the scanner in order to execute a print job in parallel, waiting time of a user needed for completing scan of a scan job increases.

SUMMARY OF THE INVENTION

The present invention provides an image processing apparatus, a control method therefor, and a storage medium storing a program for executing the control method, which are capable of executing a scan image process and another image process in parallel without reducing a scanning speed of a scanner.

Accordingly, a first aspect of the present invention provides an image processing apparatus including a scanner that scans an image of a document and generates image data, an image processor that applies an image process to image data, a scanner controller that transfers image data to the image processor from the scanner through a data bus, and a controller configured to determine whether a first image process applied to the image data generated by the scanner is executed in parallel with a second image process that differs from the first image process, determine whether a setting about the first image process is a predetermined setting, set a transfer speed of image data by the scanner controller to a first transfer speed in a case where it is determined that the first image process is not executed in parallel with the second image process, and set the transfer speed to a second transfer speed that is lower than the first transfer speed in a case where it is determined that the first image process is executed in parallel with the second image process and where the setting about the first image process is the predetermined setting.

Accordingly, a second aspect of the present invention provides a control method for an image processing apparatus including a scanner that scans an image of a document and generates image data, an image processor that applies an image process to image data, and a scanner controller that transfers image data to the image processor from the scanner through a data bus, the control method including determining whether a first image process applied to the image data generated by the scanner is executed in parallel with a second image process that differs from the first image process, determining whether a setting about the first image process is a predetermined setting, setting a transfer speed of image data by the scanner controller to a first transfer speed in a case where it is determined that the first image process is not executed in parallel with the second image process, and setting the transfer speed to a second transfer speed that is lower than the first transfer speed in a case where it is determined that the first image process is executed in parallel with the second image process and where the setting about the first image process is the predetermined setting.

Accordingly, a third aspect of the present invention provides a non-transitory computer-readable storage medium storing a control program causing a computer to execute the control method of the second aspect.

According to the present invention, a scan image process and another image process are executable in parallel without reducing the scanning speed of the scanner.

Further features of the present invention will become apparent from the following description of exemplary embodiments with reference to the attached drawings.

BRIEF DESCRIPTION OF THE DRAWINGS

FIG. 13A and FIG. 13B are tables for describing control that parallelly operates image processes in jobs.

FIG. 16 is a flowchart showing procedures of a parallel operation control process executed by the MFP of FIG. 1 when a copy job is entered.

FIG. 18A is a flowchart showing procedures of a scan control process executed by an MFP concerning a second embodiment.

FIG. 18B is a flowchart showing procedures of a switch necessity determination process executed in a step S1805 in FIG. 18A.

FIG. 19 is a table for describing determination by the switch necessity determination process of FIG. 18B.

FIG. 21 is a table for describing determination by the execution necessity determination process of FIG. 20B.

DESCRIPTION OF THE EMBODIMENTS

Figure 1:
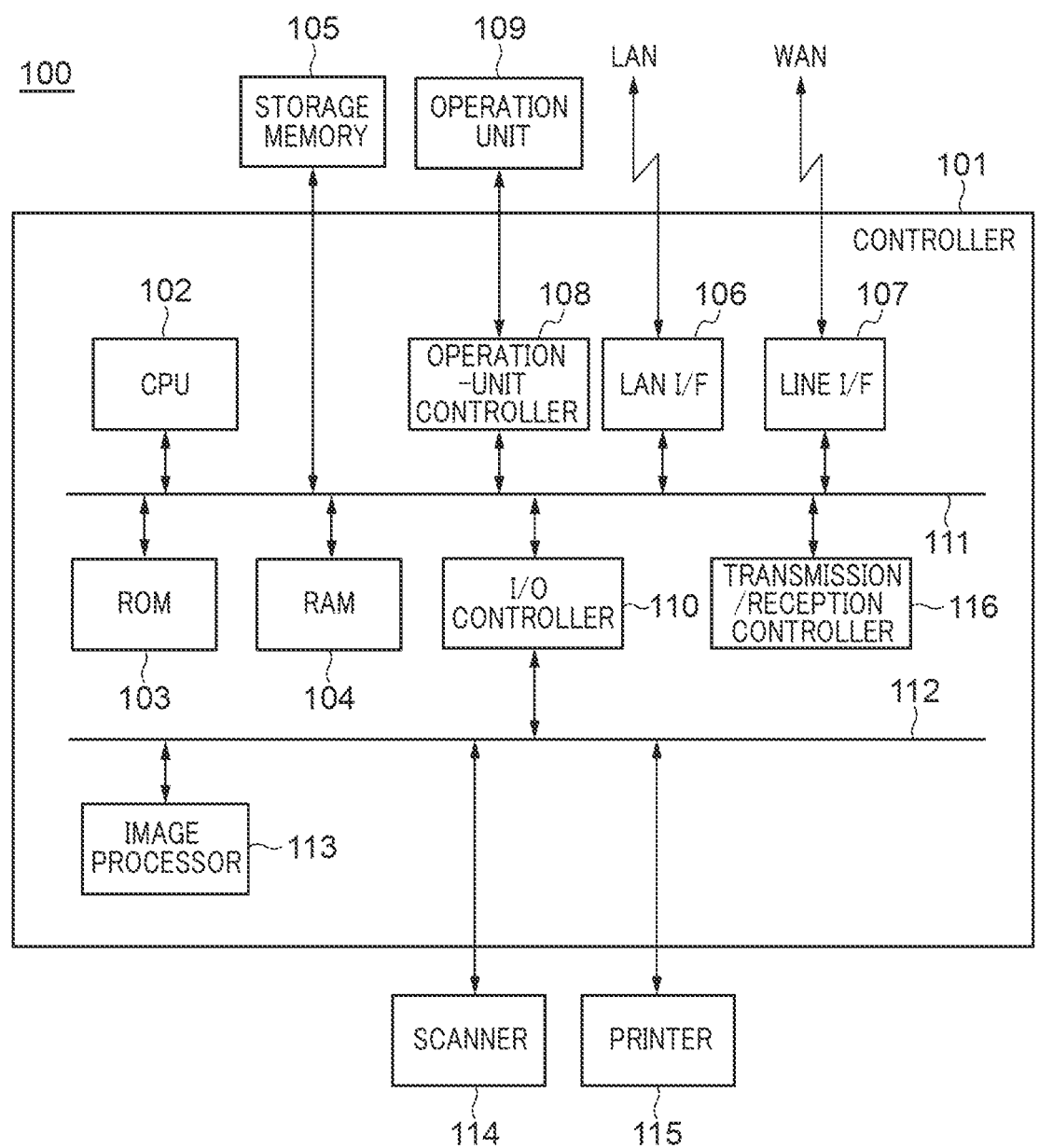
FIG. 1 is a block diagram schematically showing a configuration of an MFP as an image processing apparatus concerning an embodiment of the present invention.

Hereafter, embodiments of the present invention will be described in detail by referring to the drawings. First, an image processing apparatus concerning a first embodiment of the present invention is described.

FIG. 1 is a block diagram schematically showing a configuration of an MFP 100 as an image processing apparatus concerning the first embodiment of the present invention.

As shown in FIG. 1, the MFP 100 is provided with a controller 101, a storage memory 105, an operation unit 109, a scanner 114, and a printer 115. The controller 101 is connected with the storage memory 105, operation unit 109, scanner 114, and printer 115. Moreover, the controller 101 is provided with a CPU 102, a ROM 103, a RAM 104, a LAN I/F 106, a line I/F 107, an operation-unit controller 108, an IO controller 110, an image processor 113, and a transmission/reception controller 116. The CPU 102, ROM 103, RAM 104, LAN I/F 106, line I/F 107, operation-unit controller 108, IO controller 110, and transmission/reception controller 116 are mutually connected through a system bus 111. The image processor 113 is connected with the IO controller 110 through an image bus (data bus) 112.

The controller 101 totally controls the entire MFP 100. The CPU 102 runs programs stored in the ROM 103 or the storage memory 105 to control software modules (not shown) of the MFP 100 to execute respective processes. The ROM 103 stores a boot program for the system. The RAM 104 is a system work memory area for the CPU 102 to execute the software modules (not shown) of the MFP 100. Moreover, the RAM 104 is an image memory for storing image data temporarily when the image data is processed. The storage memory 105 consists of an HDD (Hard Disk Drive) or an SSD (Solid State Drive) and is used as internal storage. The storage memory 105 stores a system software module that achieves functions of the MFP 100 and image data that is transferred from the RAM 104, for example.

The LAN I/F 106 is an interface for connecting the MFP 100 to a LAN. The LAN I/F 106 performs data communication with an external apparatus connected to the LAN. The line I/F 107 is an interface for connecting the MFP 100 to a WAN. The line I/F 107 performs data communication with an external apparatus connected to the WAN. The transmission/reception controller 116 transmits image data read from the storage memory 105 to an external apparatus through the LAN I/F 106 or the line I/F 107. Moreover, the transmission/reception controller 116 saves the data received through the LAN I/F 106 or the line I/F 107 into the storage memory 105. The operation unit 109 consists of an LCD touch panel etc. The operation-unit controller 108 is an interface of the controller 101 and the operation unit 109. For example, the operation-unit controller 108 outputs a VGA signal to the operation unit 109 to display an image corresponding to the VGA signal on the operation unit 109. Moreover, the operation-unit controller 108 outputs information that the user inputs through the operation unit 109 to the CPU 102. The operation unit 109 interprets a VGA signal output from the operation-unit controller 108 and displays an image corresponding to the VGA signal.

The IO controller 110 is a bus bridge that connects the system bus 111 with the image bus 112 and converts the data structure of the system bus 111. The image bus 112 consists of a general-purpose bus, such as the PCI bus, IEEE 1394, or PCIEx, and transfers image data at high speed. In addition to the IO controller 110 and the image processor 113, the scanner 114 and the printer 115 are also connected to the image bus 112. The image bus 112 converts image data between a synchronizing system and an asynchronous system. The image processor 113 consists of a plurality of ASICs as shown in the FIG. 7 mentioned later. The image processor 113 applies image processes, such as a resolution conversion process, a compression process, an expansion process, and a binary-multivalued conversion process, to image data. The scanner 114 is provided with a DF (Document Feeder) 200 in FIG. 2 and a scanner controller 300 in FIG. 3. The scanner 114 scans a document and generates image data. The printer 115 prints the image data that the scanner 114 generates.

Figure 2:
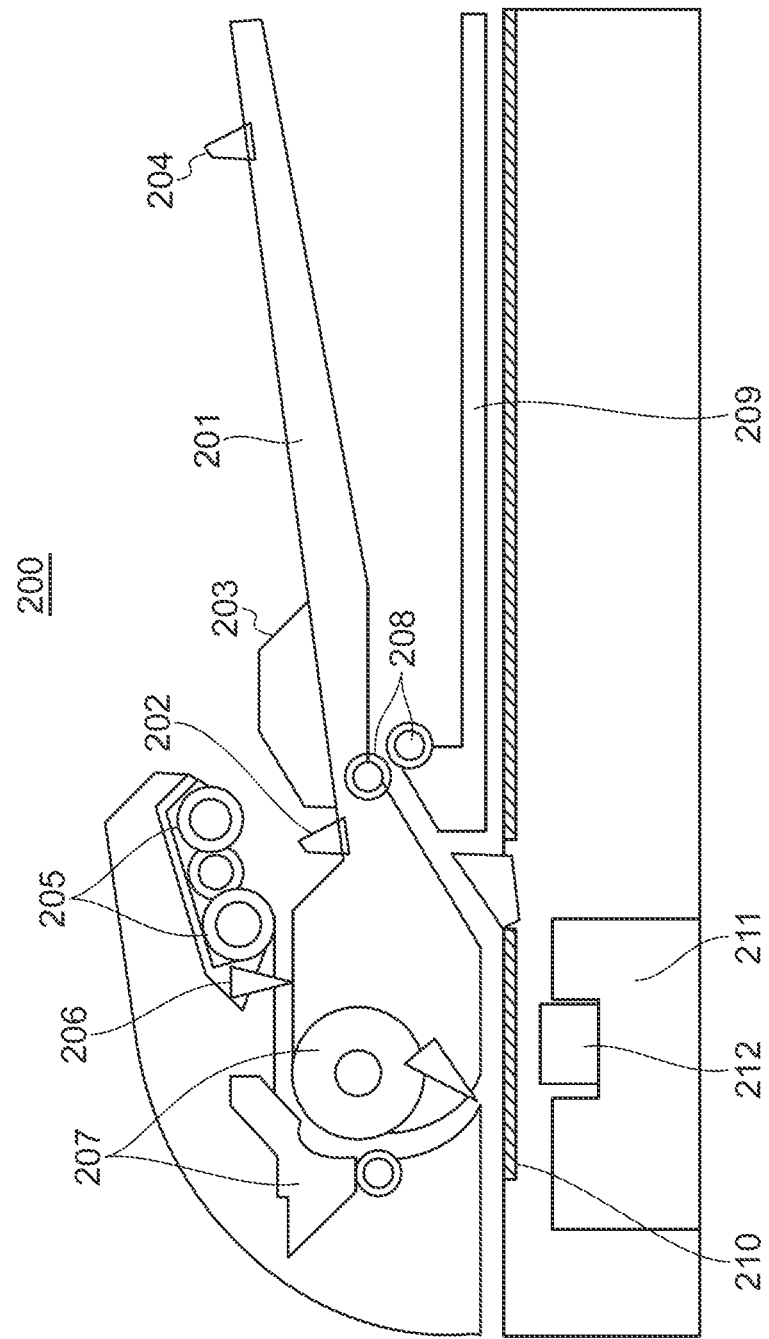
FIG. 2 is a side view showing an internal structure of a document feeder of a scanner shown in FIG. 1.

FIG. 2 is a side view showing an internal structure of the DF 200 of the scanner 114 shown in FIG. 1. It should be noted that FIG. 2 shows the internal structure as transparent in order to facilitate understanding.

The DF 200 is provided with a document tray 201 on which a document is placed. The document tray 201 is provided with a document sensor 202, a pair of document guides 203, and a document-size detection sensor 204. The document sensor 202 detects whether a document is placed on the document tray 201. The pair of document guides 203 are arranged so as to face each other in a direction that intersects perpendicularly with a conveyance direction of a document. The document placed on the document tray 201 is conveyed by three sets of rollers including a pickup roller pair 205, a conveyance roller 207, and a discharge roller pair 208. The pickup roller pair 205 conveys the document placed on the document tray 201 to a document conveyance path (not shown) of the DF 200. The document conveyed by the pickup roller pair 205 is detected by a document passage detection sensor 206. In the DF 200, it is determined whether the first document has passed on the basis of a period that the document passage detection sensor 206 detected. The conveyance roller 207 conveys the document that is conveyed to the document conveyance path by the pickup roller pair 205 to the document discharge roller pair 208. The discharge roller pair 208 conveys the document that is conveyed by the conveyance roller 207 to the document discharge tray 209. It should be noted that the pickup roller pair 205, the conveyance roller 207, and the discharge roller pair 208 are driven with a stepping motor (not shown).

A sensor unit 211 reads (scans) the document conveyed to the above-mentioned document conveyance path when the document passes a transparent DF-read window 210 provided in the document conveyance path concerned. The sensor unit 211 is provided with a CIS (Contact Image Sensor) 212 and is arranged at a position where the CIS 212 is able to read the document through the DF-read window 210 when the document is conveyed to the above-mentioned document conveyance path. The sensor unit 211 is movable in a subscanning direction. For example, the sensor unit 211 moves in the same direction as the conveyance direction of the document conveyed from the conveying roller 207 to the discharge roller pair 208. It should be noted that the DF-read window 210 has a certain length in the subscanning direction. The CIS 212 can move to an arbitrary position within the length and can scan a document at the moved position. The CIS 212 consists of a plurality of photoelectric conversion elements, for example, CCD elements. The CCD elements are linearly arranged in the CIS 212. The CIS 212 generates a control signal for controlling FIFO for storing pixel signals read by the CCD elements.

Figure 3:
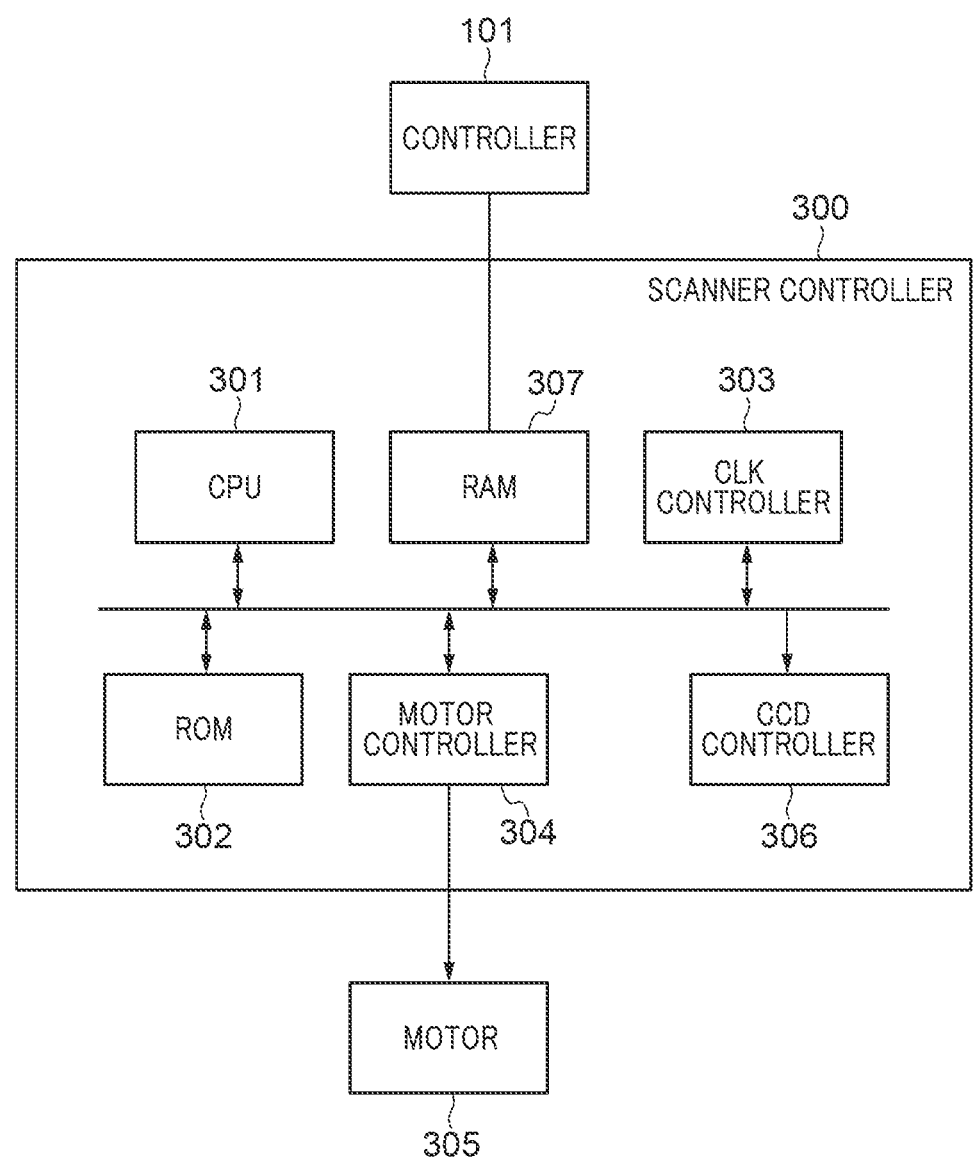
FIG. 3 is a block diagram schematically showing a configuration of a scanner controller of the scanner shown in FIG. 1.

FIG. 3 is a block diagram schematically showing a configuration of the scanner controller 300 of the scanner 114 shown in FIG. 1.

As shown in FIG. 3, the scanner controller 300 is provided with a CPU 301, ROM 302, CLK (clock) controller 303, motor controller 304, CCD controller 306, and RAM 307.

The scanner controller 300 controls operations of the scanner 114 by controlling the CPU 301 to run a scanner control application program (not shown) stored in the ROM 302. The scanner control application program activates a scanner control application (not shown) that controls the scanner controller 300. Although a case where the CPU 301 runs the scanner control application program will be described in this embodiment, a device that runs the scanner control application program is not limited to the CPU 301. For example, the CPU 102 of the controller 101 may run the scanner control application program to control the operations of the scanner 114.

The CLK controller 303 supplies a clock to devices that constitute the scanner controller 300. The clock is used also for generation of an image transfer clock mentioned later. The CLK controller 303 consists of a crystal oscillator (not shown) that generates a clock and a PLL (not shown). The PLL multiplies or divides the clock that the crystal oscillator generates. When a scan execution instruction is received from a user, the CLK controller 303 outputs the clock to the motor controller 304, CCD controller 306, and RAM 307 in the scanner 114. For example, the motor controller 304 generates a control clock for the motor 305 that rotates the rollers on the basis of the clock received from the CLK controller 303. The scan execution instruction includes information, such as a distinction between color and monochrome and a resolution. The scanner control application changes a setting of the PLL in the CLK controller 303 on the basis of contents of the instruction. The CLK controller 303 controls the frequency of the output clock on the basis of the setting of the PLL. Thereby, the scanning speed of the scanner 114 is changed. The RAM 307 stores the image data of the document that the CIS 212 reads. The RAM 307 has a capacity to store image data of four pages of an A4-size document.

Figure 4A:
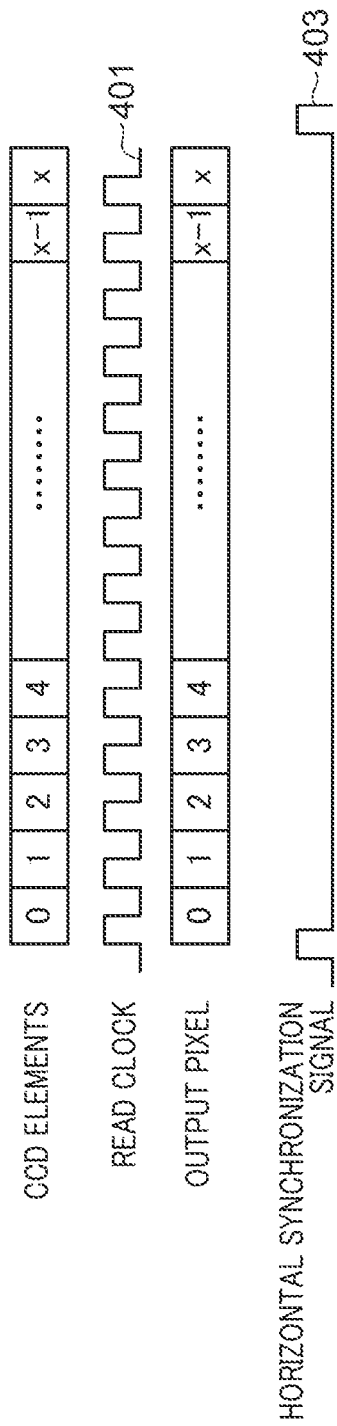
FIG. 4A and FIG. 4B are timing charts describing clocks used for controlling a contact image sensor shown in FIG. 2 when scanning an image.
}
Figure 4B:
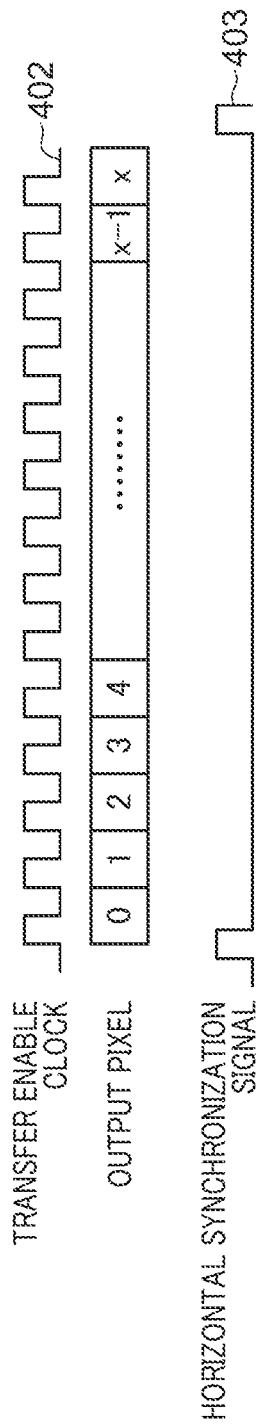

The scanner controller 300 controls scan of an image with the CIS 212 on the basis of a read clock 401 in FIG. 4A and a transfer enable clock 402 in FIG. 4B. The read clock 401 is a clock signal for reading pixel signals that constitute image data from the respective CCD elements. The transfer enable clock 402 is the image transfer clock. The image transfer clock is a clock signal for controlling whether the read pixel signals are transferred to the controller 101. The scanner controller 300 reads a pixel signal from each CCD element at a rising edge of the read clock 401. The pixel signals read from the respective CCD elements are stored in the RAM 307. Moreover, the scanner controller 300 transfers the pixel signals stored in the RAM 307 to the controller 101 in synchronization with the rising edges of the transfer enable clock 402 controlled on the basis of a horizontal synchronization signal 403 in FIG. 4A. The horizontal synchronization signal 403 is a clock signal that controls a taking start of a line of the CCD sensor.

Moreover, the scanner controller 300 generates a PWM signal for the motor that drives the pickup roller pair 205, conveyance roller 207, and discharge roller pair 208 that are provided in the scanner 114 in synchronization with the horizontal synchronization signal 403. The MFP 100 shortens the cycle of the horizontal synchronization signal 403, when performing a high-speed scanning. Thereby, rotational speeds of the pickup roller pair 205, conveyance roller 207, and discharge roller pair 208 increase relatively, which speeds up the conveyance of the document, shortening the scan period per one document. Moreover, the scanner controller 300 raises the frequency of the read clock 401 in accordance with a document scanning speed in order to shorten read time from the CCD elements. The scanner controller 300 accumulates the pixel signals to the RAM 307 in accordance with the cycle of the read clock 401. Moreover, the scanner controller 300 raises the frequency of the transfer enable clock 402 in response to the control of the frequency of the read clock 401, which shortens a time needed for transferring the pixel signals to the controller 101 from the RAM 307.

Figure 5:
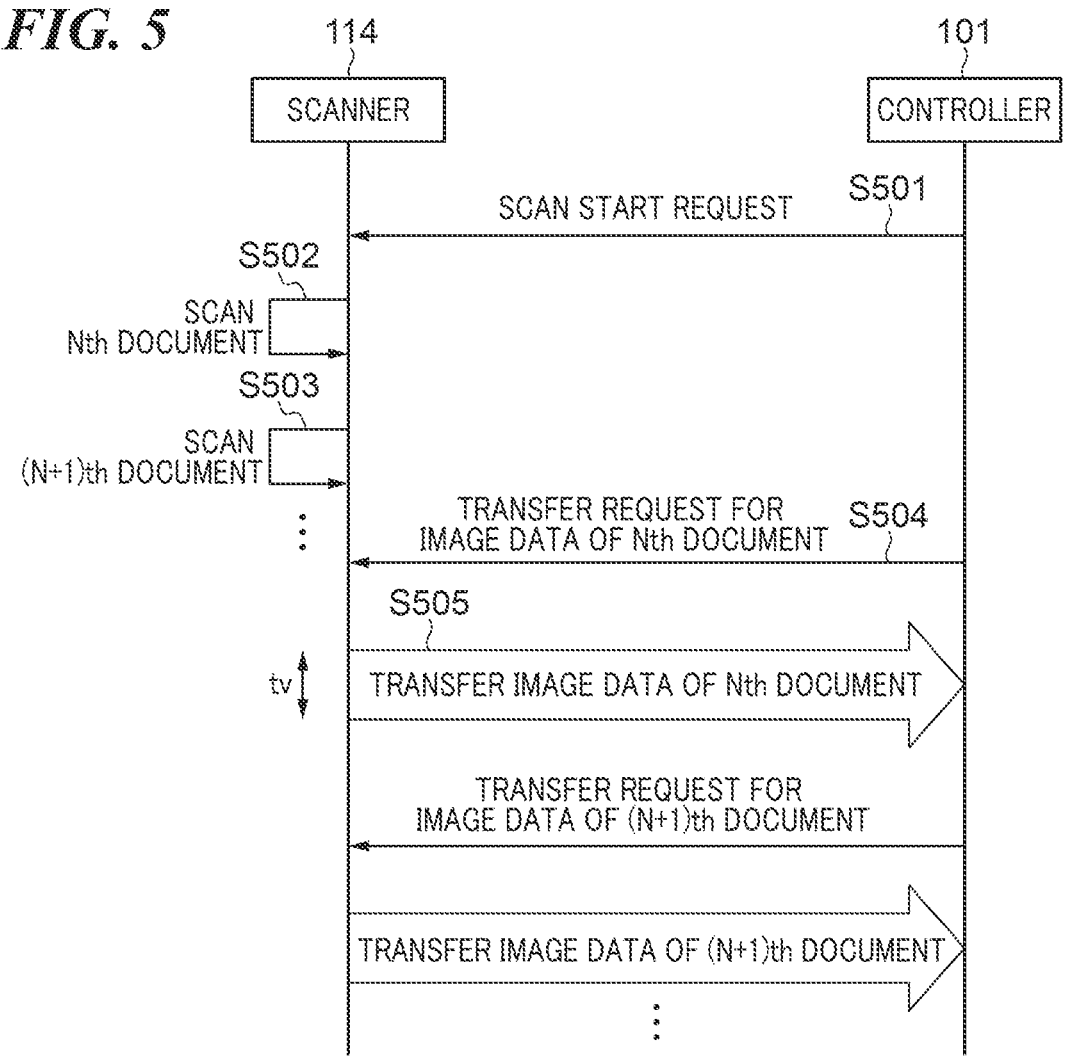
FIG. 5 is a sequence chart about an image scan operation executed by the MFP of FIG. 1.

FIG. 5 is a sequence chart about an image scan operation executed by the MFP 100 of FIG. 1. The scan operation in FIG. 5 is executed by the above-mentioned scanner control application that controls the scanner 114 and a job control application (not shown) that controls the controller 101.

As shown in FIG. 5, when receiving a scan start request from the controller 101 (a step S501), the scanner 114 scans an Nth document according to the read clock 401 (a step S502). The image data of the Nth document that consists of a plurality of pixel signals read by the CCD elements is stored in the RAM 307. When scan of the Nth document is completed, the scanner 114 scans the next ((N+1)th) document (a step S503).

Figure 6:
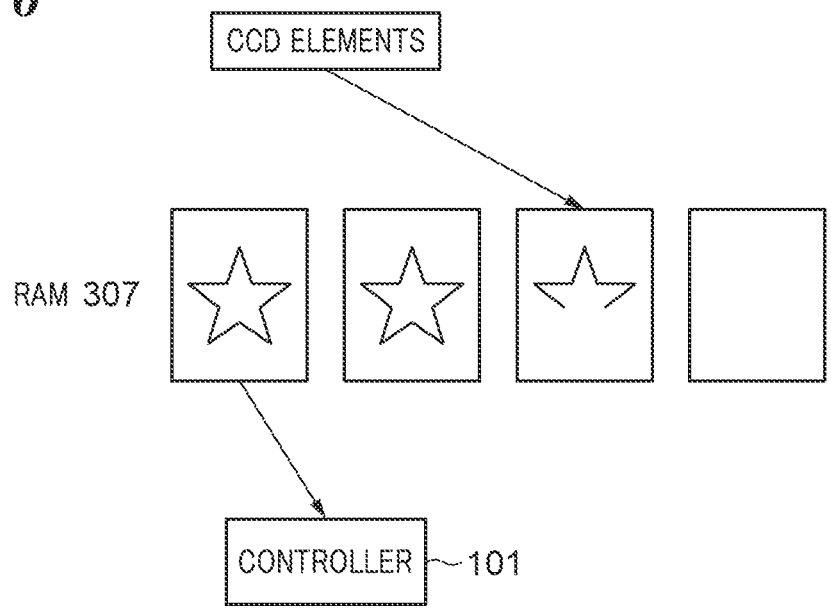
FIG. 6 is a view describing transfer of image data from a RAM to a controller shown in FIG. 3.

In the meantime, when receiving a transfer request for the image data of the Nth document from the controller 101 (a step S504), the scanner 114 transfers the image data of the Nth document to the controller 101 according to the transfer enable clock 402 (a step S505). The image data that has been transferred to the controller 101 is deleted from the RAM 307. Since the RAM 307 cannot store the image data of more than four pages, the MFP 100 is controlled so that the image data stored in the RAM 307 will be transferred to the controller 101 before using up the memory area of the RAM 307 as shown in FIG. 6.

Figure 7:
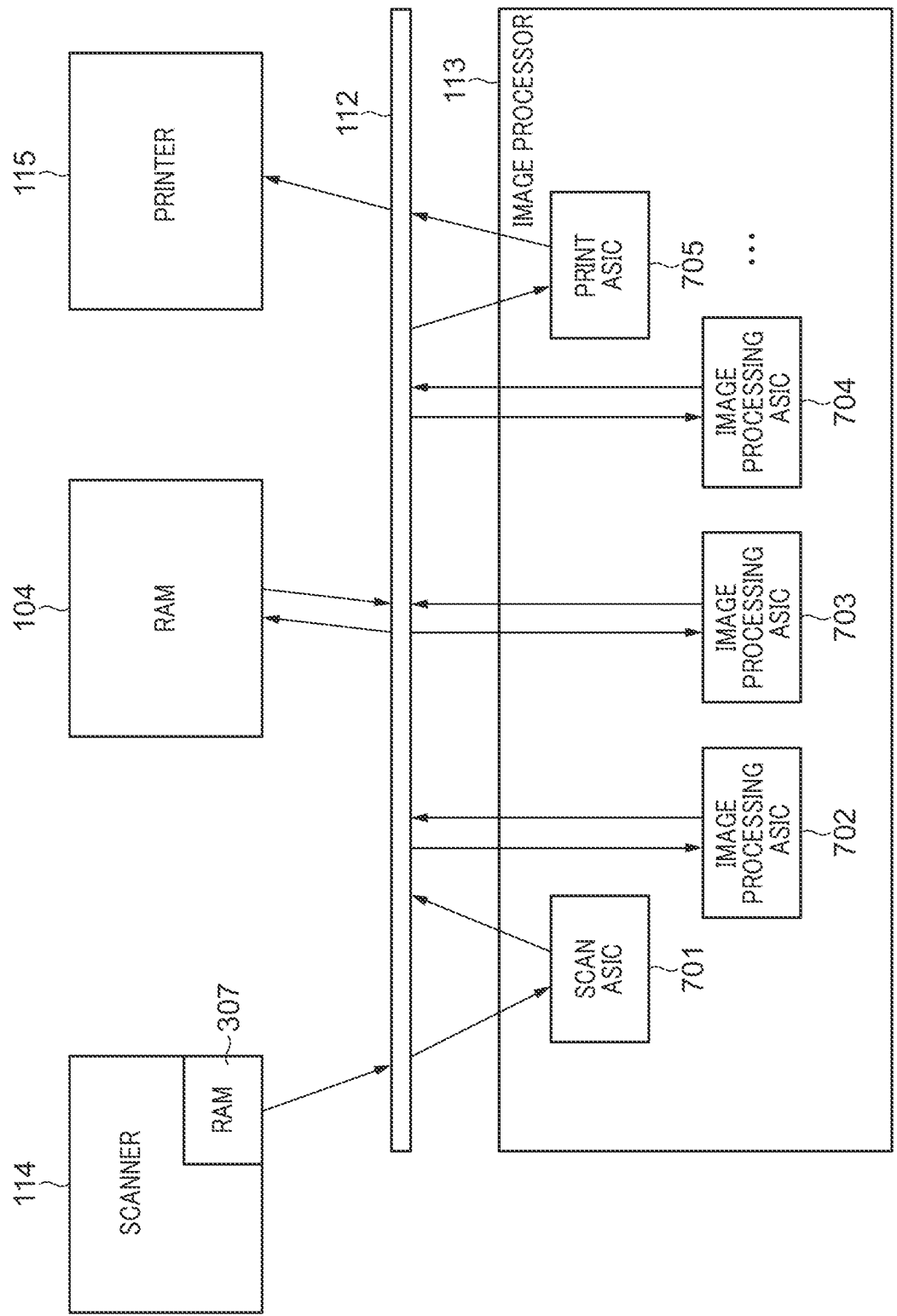
FIG. 7 is a block diagram schematically showing a configuration of an image processor shown in FIG. 1.

FIG. 7 is a block diagram schematically showing a configuration of the image processor 113 shown in FIG. 1. As shown in FIG. 7, the image processor 113 is provided with ASICs 701 through 705 that applies conversion processes, such as a resolution conversion process, a compression process, an expansion process, an image composition process, and a binary-multivalued conversion process, an image format conversion process, and a rendering process, to image data. The ASICs 701 through 705 share the RAM 104 and input and output data through the image bus 112. It should be noted that at least one of the above-mentioned conversion processes is executed in a scan image process, a print image process, a Rip image process, an imaging process, a send image process, and a facsimile (FAX) image process, in the embodiment. For example, in the scan image process, the resolution conversion process, compression process, and image format conversion process are applied to image data so that the image data will be converted into image data of a desired size and a desired file format. In the print image process, conversion processes, such as the expansion process and the image composition process, are applied to image data. In the Rip image process, the rendering process and the image format conversion process are applied to image data to generate print image data. In the imaging process, the expansion process, the binary-multivalued conversion process, the image format conversion process, and the compression process are applied to image data to generate image data suitable for attachment to an E-mail and for transmission to FTP in addition to the print image data. In the send image process, the image format conversion process is applied to image data. For example, image data saved in the storage memory 105 is converted into a file format of JPEG or PDF. In the facsimile image process, the multivalued-binary conversion process etc. are performed to generate image data for facsimile transmissions.

The image processor 113 is able to execute image processes in parallel by using the ASICs 701 through 705. For example, the scan image process by the ASIC 701 is executed in parallel with the print image process by the ASIC 702. At this time, data is transferred through the image bus 112, which congests the image bus 112. For example, when the scanner 114 performs a high-speed scan in the scan image process, the data transfer amount through the image bus 112 per unit time will become huge and may exceed a transferable upper limit value of the image bus 112. When the data transfer amount through the image bus exceeds the transferable upper limit value, the data transfer through the image bus 112 becomes impossible and the execution of the image processes will stop. In light of this problem, the conventional MFP reduces the scanning speed of the scanner 114 to control the data transfer amount through the image bus 112 per unit time, for example. However, since such a method reduces the scanning speed of the scanner 114 in order to execute the image process by the ASIC 702 in parallel, the MFP 100 cannot exhibit performance equivalent to the high-speed scan set by the user. As a result, waiting time of the user needed for completing a scan by the scanner 114 will increase.

Against this, in the embodiment, when the scan image process is executed independently, the frequency of the transfer enable clock 402 is set to a first frequency. Moreover, when the scan image process is executed in parallel with another image process, the frequency of the transfer enable clock 402 is set to a second frequency lower than the first frequency.

Figure 8:
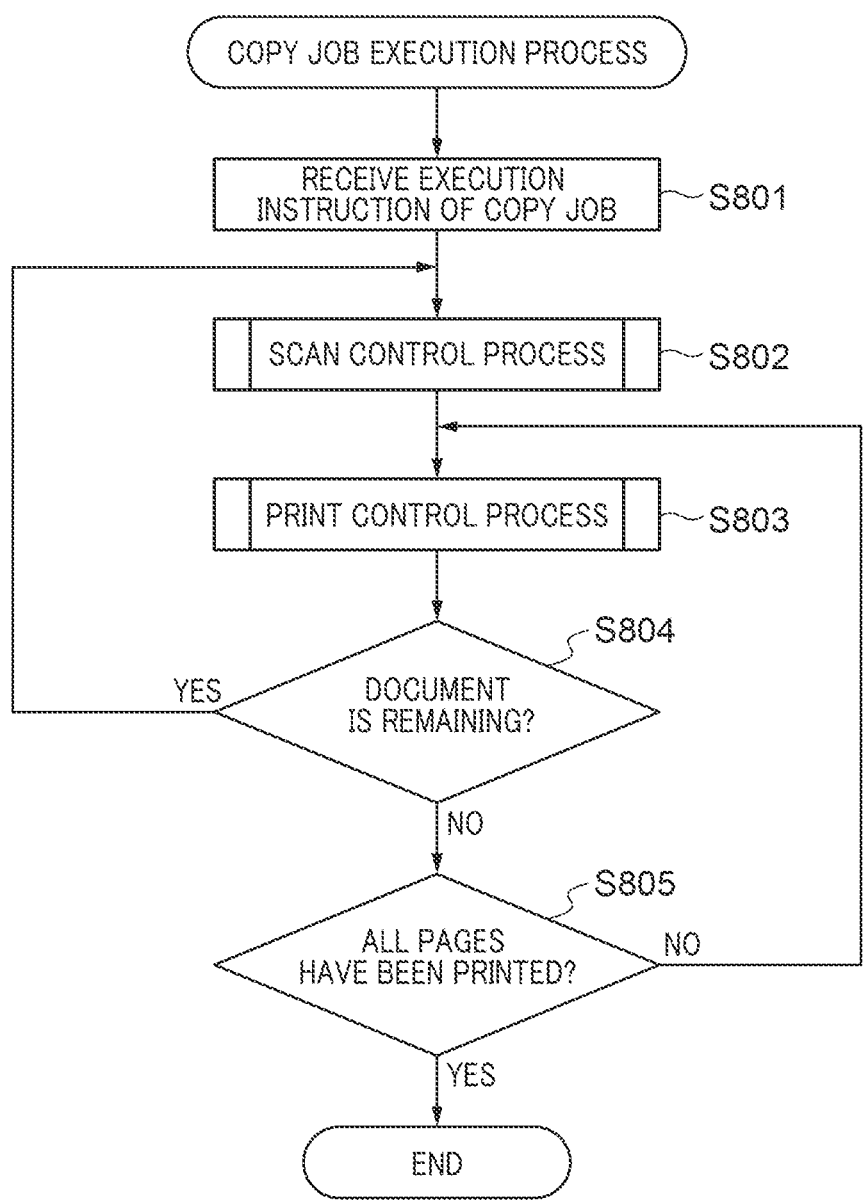
FIG. 8 is a flowchart showing procedures of a copy job execution process executed by the MFP of FIG. 1.

FIG. 8 is a flowchart showing procedures of a copy job execution process executed by the MFP 100 of FIG. 1. The process of FIG. 8 is performed when the CPU 102 runs the program stored in the ROM 103 etc.

As shown in FIG. 8, when the CPU 102 receives an execution instruction of a copy job through the operation unit 109 (a step S801), the CPU 102 executes a scan control process of FIG. 9 mentioned later (a step S802). Next, the CPU 102 executes a print control process of FIG. 10 mentioned later (a step S803) in parallel with the step S802. When the copy job received in the step S801 is a job that copies two or more documents, the CPU 102 performs the processes of the steps S802 and S803 for every document. Next, the CPU 102 determines whether the document is remaining on the DF 200 (a step S804).

As a result of the determination in the step S804, when the document is remaining on the DF 200, the CPU 102 returns the process to the step S802. As a result of the determination in the step S804, when no document is remaining on the DF 200, the CPU 102 determines whether all the pages have been printed (a step S805).

As a result of the determination in the step S805, when at least one page has not been printed, the CPU 102 returns the process to the step S803. As a result of the determination in the step S805, when all the pages have been printed, the CPU 102 finishes this process.

Figure 9:
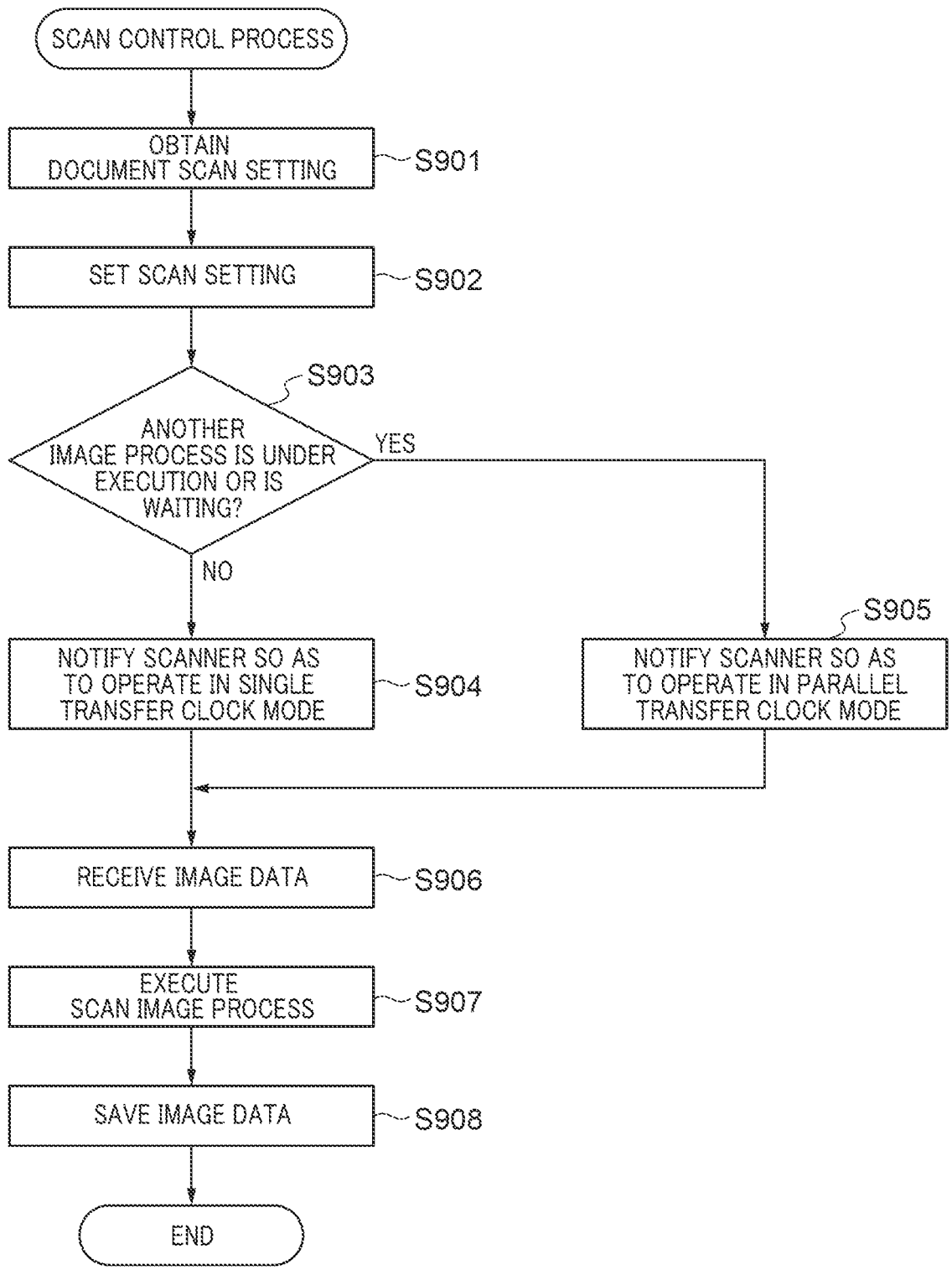
FIG. 9 is a flowchart showing procedures of a scan control process executed in a step S802 in FIG. 8.

FIG. 9 is a flowchart showing procedures of the scan control process executed in the step S802 in FIG. 8.

As shown in FIG. 9, the CPU 102 obtains a scan setting of the copy job set through the operation unit 109 (a step S901). Next, the CPU 102 selects the ASIC that will execute the scan image process corresponding to the obtained scan setting from among the ASICs 701 through 705 of the image processor 113, and sets the scan setting to the ASIC selected (a step S902). Next, the CPU 102 determines whether another image process by an ASIC other than the selected ASIC is under execution or is waiting (a step S903). The other image process is executed in parallel in the job of which the execution instruction was received. For example, the other image process is the print image process executed in parallel in the copy job.

As a result of the determination in the step S903, when another image process is not under execution and is not waiting, the CPU 102 notifies the scanner 114 so as to operate in a single transfer clock mode (a step S904). In the single transfer clock mode, the CLK controller 303 sets the frequency of the transfer enable clock 402 to the first frequency. The scanner 114 transfers image data to the controller 101 by the transfer enable clock 402 concerned. At this time, a transfer speed of the image data is set to a first transfer speed. Next, the CPU 102 performs a process from a step S906 mentioned later.

As a result of the determination in the step S903, when another image process is under execution or is waiting, the CPU 102 notifies the scanner 114 so as to operate in a parallel transfer clock mode (a step S905). In the parallel transfer clock mode, the CLK controller 303 sets the frequency of the transfer enable clock 402 to the second frequency lower than the first frequency. The scanner 114 transfers image data to the controller 101 by the transfer enable clock 402 concerned. This reduces the number of the transfer enable clocks 402 per unit time in the scan image process, which reduces the data transfer amount per unit time through the image bus 112. At this time, the transfer speed of the image data is set to a second transfer speed that is lower than the first transfer speed. Next, the CPU 102 receives image data from the scanner 114 (the step S906) and applies the scan image process to the received image data with the ASIC to which the scan setting is set (a step S907). Next, the CPU 102 saves the image data, which has been subjected to the scan image process, in the RAM 104 (a step S908) and finishes this process.

Figure 10:
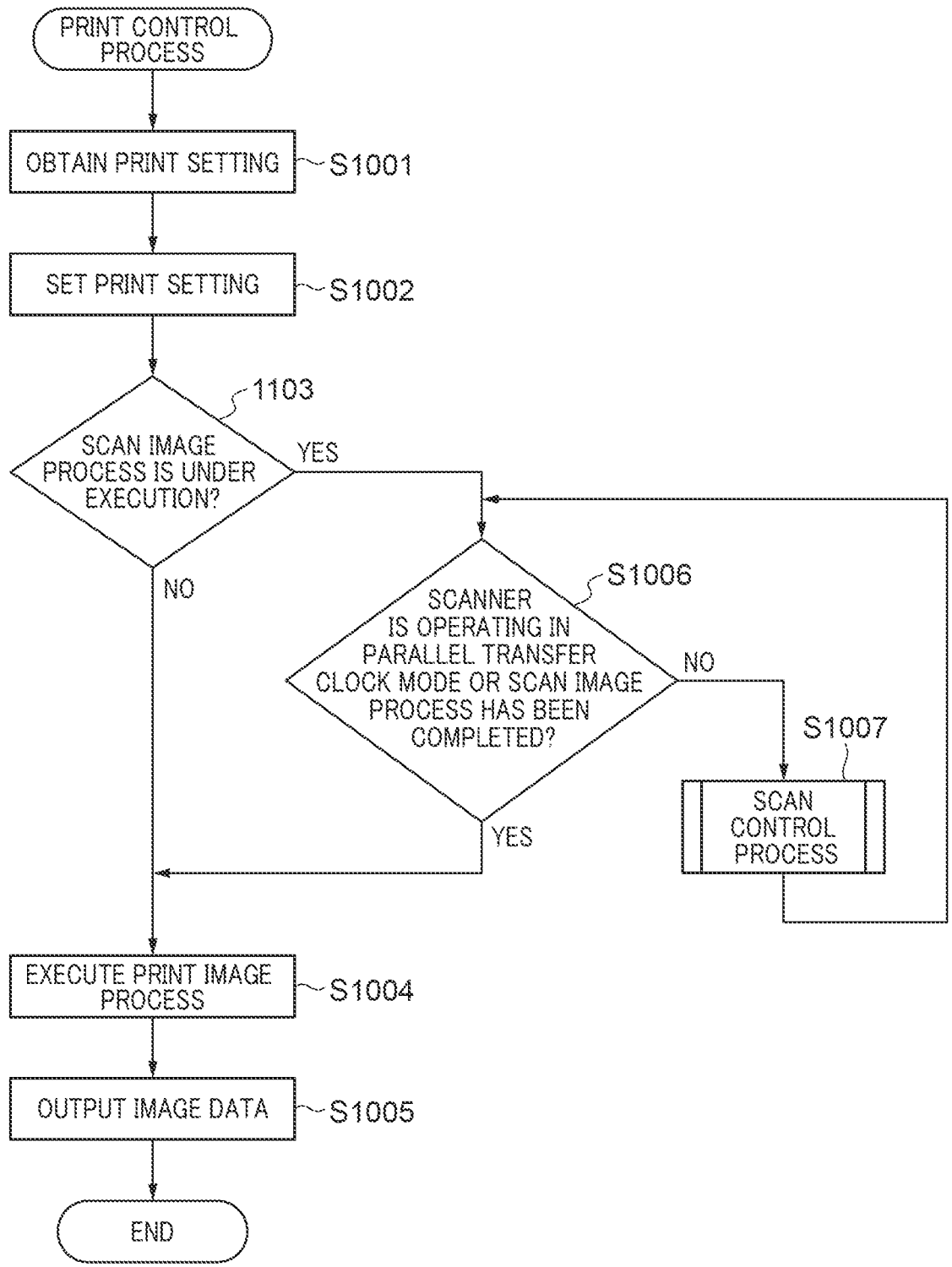
FIG. 10 is a flowchart showing procedures of a print control process executed in a step S803 in FIG. 8.

FIG. 10 is a flowchart showing procedures of the print control process executed in the step S803 in FIG. 8.

As shown in FIG. 10, the CPU 102 obtains a pint setting of the copy job set through the operation unit 109 (a step S1001). Next, the CPU 102 selects the ASIC that will execute the print image process corresponding to the obtained print setting from among the ASICs 701 through 705 of the image processor 113, and sets the print setting to the ASIC selected (a step S1002). Next, the CPU 102 determines whether the scan image process is under execution (a step S1003).

As a result of the determination in the step S1003, when the scan image process is not under execution, the CPU 102 applies the print image process to the image data stored in the RAM 104 with the ASIC to which the print setting is set (a step S1004). Next, the CPU 102 outputs the image data, which has been subjected to the print image process, to the printer 115 (a step S1005) and finishes this process. The printer 115 prints the image data obtained onto a recording sheet. Next, the CPU 102 finishes this process.

As a result of the determination in the step S1003, when the scan image process is under execution, the CPU 102 determines whether the scanner 114 is operating in the parallel transfer clock mode or whether the scan image process is completed (a step S1006).

As a result of the determination in the step S1006, when the scanner 114 is not operating in the parallel transfer clock mode and the scan image process is not completed, the CPU 102 executes the scan control process of FIG. 9 (a step S1007). After finishing the process in the step S1007, the CPU 102 returns the process to the step S1006.

As a result of the determination in the step S1006, when the scanner 114 is operating in the parallel transfer clock mode or the scan image process is completed, the CPU 102 performs the process from the step S1004.

Figure 11B:
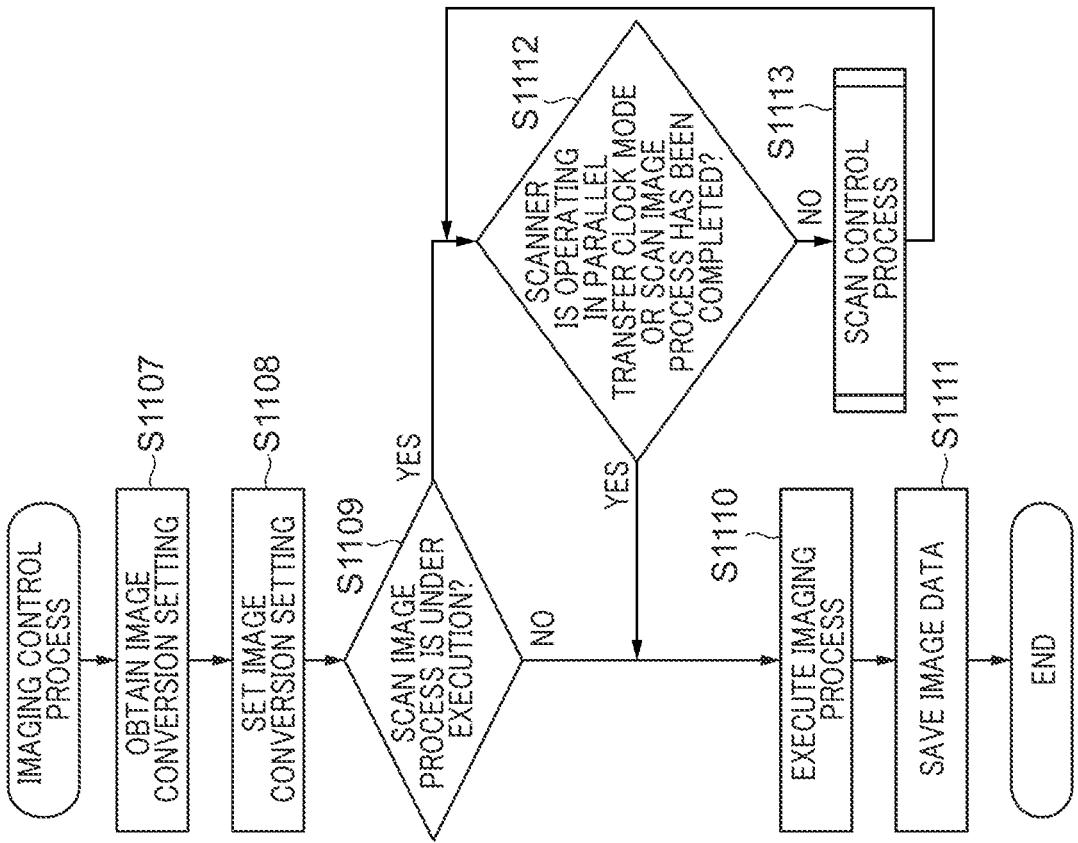
FIG. 11B is a flowchart showing procedures of an imaging control process executed in a step S1103 in FIG. 11A.
Figure 11A:
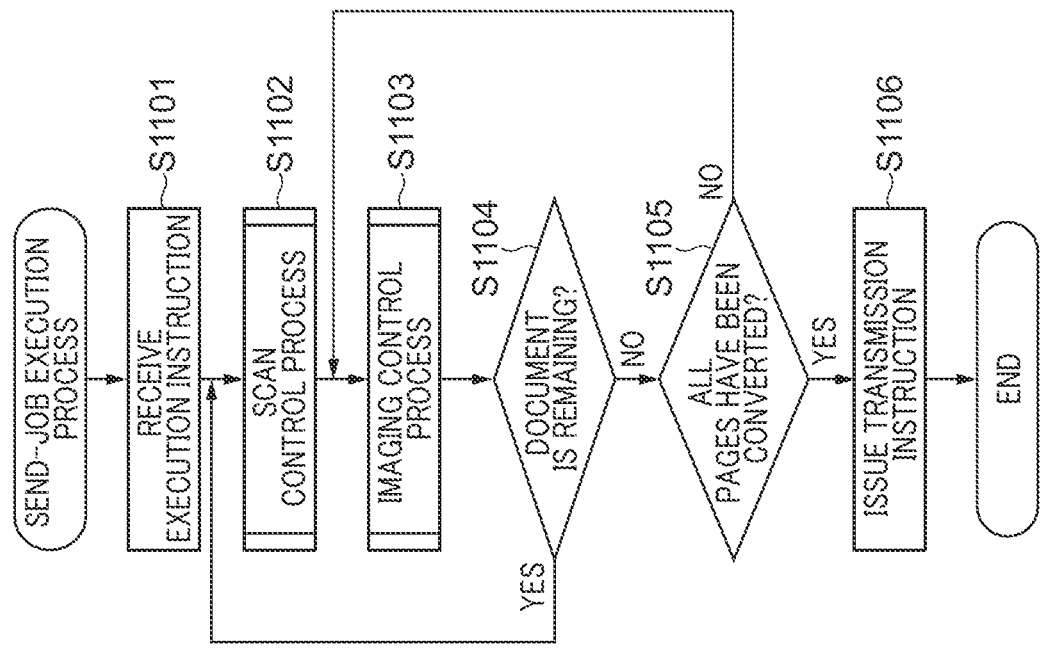
FIG. 11A is a flowchart showing procedures of a send-job execution process executed by the MFP of FIG. 1.

FIG. 11A is a flowchart showing procedures of a send-job execution process executed by the MFP 100 of FIG. 1. The send-job execution process is also performed when the CPU 102 runs the program stored in the ROM 103 etc. like the copy job execution process mentioned above.

As shown in FIG. 11A, when the CPU 102 receives an execution instruction of a send job through the operation unit 109 (a step S1101), the CPU 102 executes the scan control process mentioned above on the basis of send settings that are needed for execution of the send job (a step S1102). It should be noted that a user enters the send settings through the operation unit 109 when instructing execution of the send job in this embodiment. Moreover, the CPU 102 executes an imaging control process of FIG. 11B in parallel with the step S1102 on the basis of the above-mentioned send settings (a step S1103). When the send job received in the step S1101 is a job that scans two or more documents, the CPU 102 performs the processes of the steps S1102 and S1103 for every document. Next, the CPU 102 determines whether the document is remaining on the DF 200 (a step S1104).

As a result of the determination in the step S1104, when the document is remaining on the DF 200, the CPU 102 returns the process to the step S1102. As a result of the determination in the step S1104, when no document is remaining on the DF 200, the CPU 102 determines whether the image data of all the pages have been converted (a step S1105).

As a result of the determination in the step S1105, when image data of at least one page has not been converted, the CPU 102 returns the process to the step S1103. As a result of the determination in the step S1105, when the image data of all the pages have been converted, the CPU 102 issues a transmission instruction to the transmission/reception controller 116 (a step S1106). When receiving the transmission instruction, the transmission/reception controller 116 transmits the converted image data to an external apparatus. Next, the CPU 102 finishes this process.

FIG. 11B is a flowchart showing procedures of the imaging control process executed in the step S1103 in FIG. 11A.

As shown in FIG. 11B, the CPU 102 obtains an image conversion setting in the send settings entered through the operation unit 109 (a step S1107). Next, the CPU 102 selects the ASIC that will execute the imaging process according to the obtained image conversion setting from among the ASICs 701 through 705 of the image processor 113, and sets the image conversion setting to the ASIC selected (a step S1108). Next, the CPU 102 determines whether the scan image process is under execution (a step S1109).

As a result of the determination in the step S1109, when the scan image process is not under execution, the CPU 102 applies the imaging process to the image data stored in the RAM 104 (a step S1110). Next, the CPU 102 saves the image data, which has been subjected to the imaging process, in the storage memory 105 (a step S1111) and finishes this process.

As a result of the determination in the step S1109, when the scan image process is under execution, the CPU 102 determines whether the scanner 114 is operating in the parallel transfer clock mode or whether the scan image process is completed (a step S1112).

As a result of the determination in the step S1112, when the scanner 114 is not operating in the parallel transfer clock mode and the scan image process is not completed, the CPU 102 executes the scan control process mentioned above (a step S1113). After finishing the process in the step S1113, the CPU 102 returns the process to the step S1112.

As a result of the determination in the step S1112, when the scanner 114 is operating in the parallel transfer clock mode or the scan image process is completed, the CPU 102 performs the process from the step S1110.

Figure 12B:
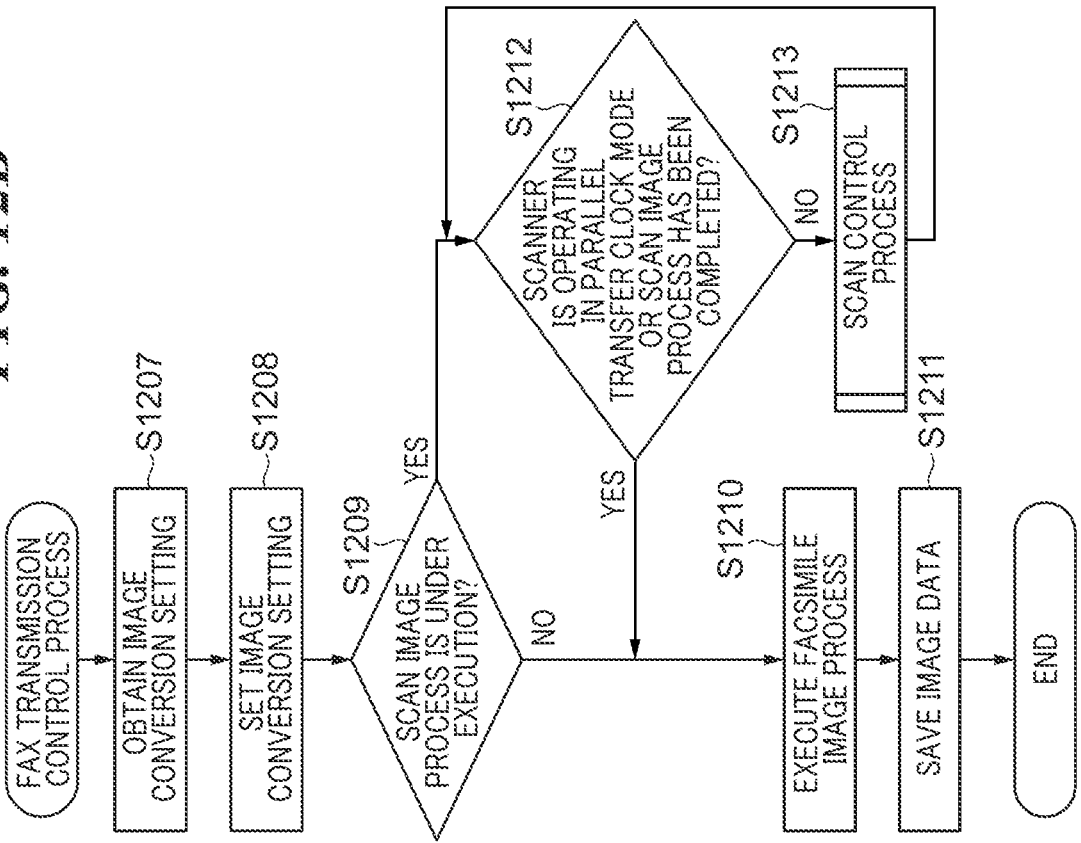
FIG. 12B is a flowchart showing procedures of a facsimile transmission control process executed in a step S1203 in FIG. 12A.
Figure 12A:
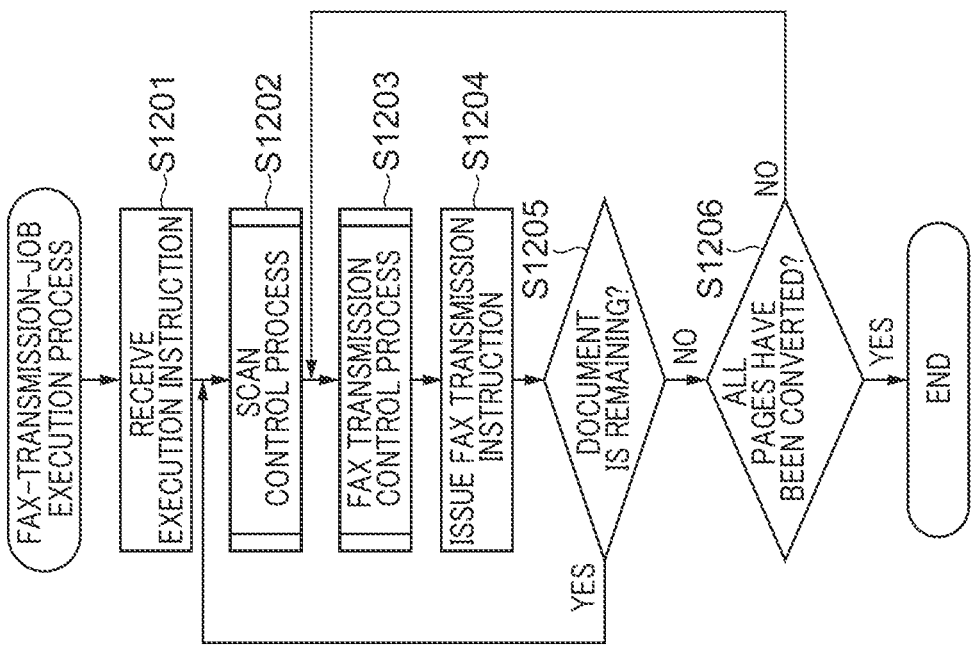
FIG. 12A is a flowchart showing procedures of a facsimile-transmission job execution process executed by the MFP of FIG. 1.

FIG. 12A is a flowchart showing procedures of a facsimile-transmission-job execution process executed by the MFP 100 of FIG. 1. The facsimile-transmission-job execution process is also performed when the CPU 102 runs the program stored in the ROM 103 etc. like the copy job execution process mentioned above.

As shown in FIG. 12A, when the CPU 102 receives an execution instruction of a facsimile transmission job through the operation unit 109 (a step S1201), the CPU 102 executes the scan control process mentioned above on the basis of facsimile transmission settings that are needed for execution of the facsimile transmission job (a step S1202). It should be noted that a user enters the facsimile transmission settings through the operation unit 109 when instructing execution of the facsimile transmission job in this embodiment. Moreover, the CPU 102 executes a facsimile transmission control process of FIG. 11B mentioned later in parallel with the step S1202 on the basis of the above-mentioned facsimile transmission settings (a step S1203). When the facsimile transmission job received in the step S1201 is a job that transmits two or more documents by facsimile, the CPU 102 performs the processes of the steps S1202 and S1203 for every document. Next, the CPU 102 issues a facsimile transmission instruction to the transmission/reception controller 116 (a step S1204). When receiving the facsimile transmission instruction, the transmission/reception controller 116 transmits the image data, which has been subjected to the facsimile image process, to an external apparatus by facsimile. Next, the CPU 102 determines whether the document is remaining on the DF 200 (a step S1205).

As a result of the determination in the step S1205, when the document is remaining on the DF 200, the CPU 102 returns the process to the step S1202. As a result of the determination in the step S1205, when no document is remaining on the DF 200, the CPU 102 determines whether the image process for all the pages has been completed (a step S1206).

As a result of the determination in the step S1206, when the image process for at least one page has not been completed, the CPU 102 returns the process to the step S1203. As a result of the determination in the step S1206, when the image process for all the pages has been completed, the CPU 102 finishes this process.

FIG. 12B is a flowchart showing procedures of the facsimile transmission control process executed in the step S1203 in FIG. 12A.

As shown in FIG. 11B, the CPU 102 obtains an image conversion setting in the facsimile transmission settings entered through the operation unit 109 (a step S1207). Next, the CPU 102 selects the ASIC that will execute the facsimile image process according to the obtained image conversion setting from among the ASICs 701 through 705 of the image processor 113, and sets the image conversion setting to the ASIC selected (a step S1208). Next, the CPU 102 determines whether the scan image process is under execution (a step S1209).

As a result of the determination in the step S1209, when the scan image process is not under execution, the CPU 102 applies the facsimile image process to the image data stored in the RAM 104 (a step S1210). Next, the CPU 102 saves the image data, which has been subjected to the image process, in the storage memory 105 (a step S1211) and finishes this process.

As a result of the determination in the step S1209, when the scan image process is under execution, the CPU 102 determines whether the scanner 114 is operating in the parallel transfer clock mode or whether the scan image process is completed (a step S1212).

As a result of the determination in the step S1212, when the scanner 114 is not operating in the parallel transfer clock mode and the scan image process is not completed, the CPU 102 executes the scan control process mentioned above (a step S1213). After finishing the process in the step S1213, the CPU 102 returns the process to the step S1212.

As a result of the determination in the step S1213, when the scanner 114 is operating in the parallel transfer clock mode or the scan image process is completed, the CPU 102 performs the process from the step S1210.

In the processes of FIG. 8 through FIG. 12B, when the scan image process is executed independently, the frequency of the transfer enable clock 402 is set to the first frequency. Moreover, when the scan image process is executed in parallel with another image process, the frequency of the transfer enable clock 402 is set to the second frequency lower than the first frequency. Thereby, when the scan image process is executed in parallel with another image process, the data transfer amount per unit time through the image bus 112 can be controlled so as not to exceed the transferable upper limit value by the method other than the control of the scanning speed of the scanner 114. As a result, another image process is executable in parallel without reducing the scanning speed of the scanner 114.

Next, control that parallelly operates (parallelly executes) image processes in jobs will be described.

FIG. 13A and FIG. 13B are tables for describing the control that parallelly operates image processes in jobs. FIG. 13A is a table showing a combination of image processes for each job type. FIG. 13B is a table showing possibility of a parallel operation of image processes in jobs.

The embodiment describes a copy job, a send job, a facsimile transmission job, a PDL job, a box job, and a pull-scan job as examples of jobs. In the copy job described here, the printer 115 prints image data of a document that is scanned by the scanner 114. In the send job, the image processor 113 applies image conversion to image data of a document that is scanned by the scanner 114, and the transmission/reception controller 116 sends the converted image data to an external apparatus using an E-mail or FTP. In the facsimile transmission job, the scanner 114 scans image data of a document, the image processor 113 applies image conversion to the image data, and the transmission/reception controller 116 transmits the converted image data by facsimile. In the PDL job, the image processor 113 generates image data by rendering print data received via the transmission/reception controller 116, and the printer 115 prints the image data concerned. In the box job, image data of a document that is scanned with the scanner 114 is saved in the storage memory 105. In the pull-scan job, image data of a document that is scanned with the scanner 114 is saved in the storage memory 105 according to an instruction received from a PC through the transmission/reception controller 116, and the transmission/reception controller 116 transmits the image data to the above-mentioned PC.

Each job mentioned above consists of at least one of the image processes mentioned above as shown in FIG. 13A. Accordingly, when a plurality of jobs are entered, image processes are executed in parallel in the jobs as shown in FIG. 13B.

For example, the copy job consists of the scan image process (referred to as "Scan" in FIG. 13A) and the print image process (referred to as "Print" in FIG. 13A). The box job consists of the scan image process. When such a copy job and box job are entered, the MFP 100 cannot execute the scan image processes in parallel because the MFP 100 is provided with only one scanner 114. Accordingly, when the scan image process of the copy job is executed precedingly, for example, the scan image process of the box job will be in a standby state without being executed. When the scan image process of the copy job is completed and the print image process of the copy job is started, the scan image process of the box job is started.

In the meantime, when the scan image process of the box job is executed precedingly, the scan image process of the copy job will be in the standby state without being executed. When the scan image process of the box job is completed, the scan image process of the copy job is started. However, since the box job has finished all the processes at this time point, the copy job and the box job are not executed in parallel. As mentioned above, the box job is executed in parallel when the copy job is entered precedingly, but the copy job is not executed in parallel when the box job is entered precedingly in the embodiment. In FIG. 13B, a symbol "O" indicates a combination of a job (referred to as a "preceding job") entered precedingly and a job (referred to as a "following job") entered subsequently that are executed in parallel. A symbol "X" indicates a combination of jobs that are not executed in parallel.

Next, control in a case where two jobs are executed in parallel in the table of FIG. 13B will be described.

Figure 14B:
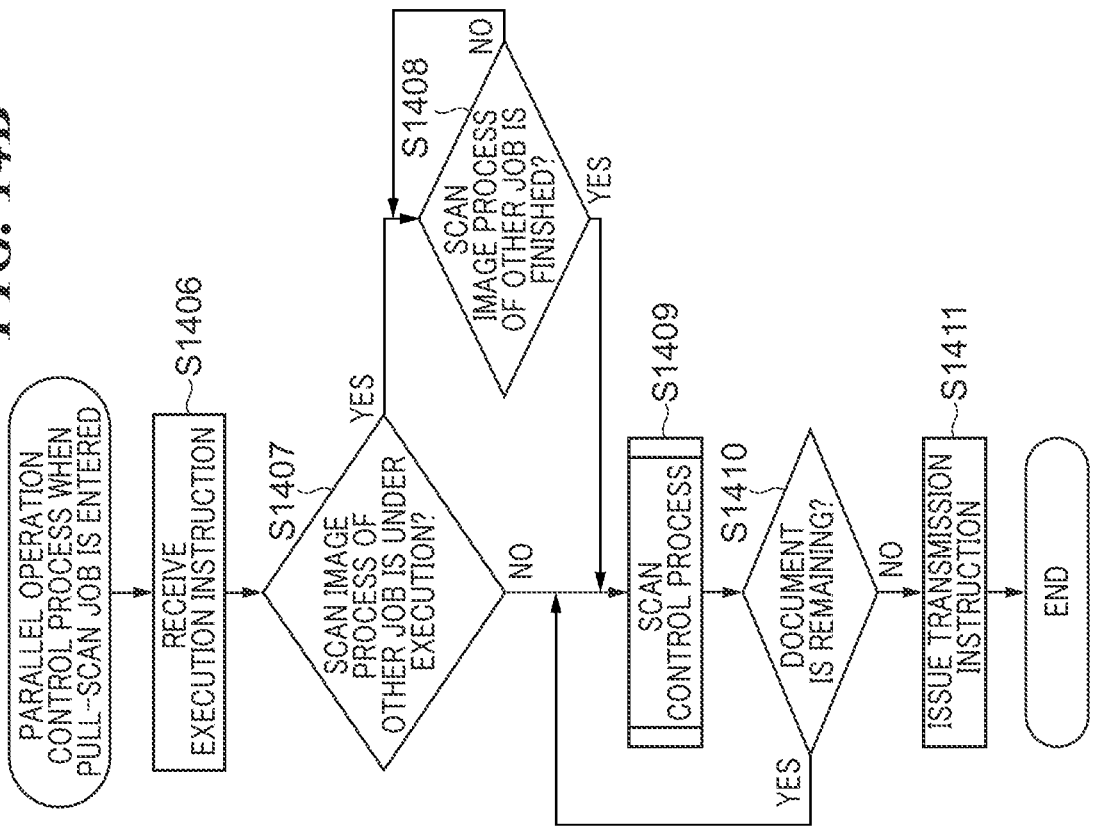
FIG. 14B is a flowchart showing procedures of a parallel operation control process executed by the MFP of FIG. 1 when a pull-scan job is entered.
Figure 14A:
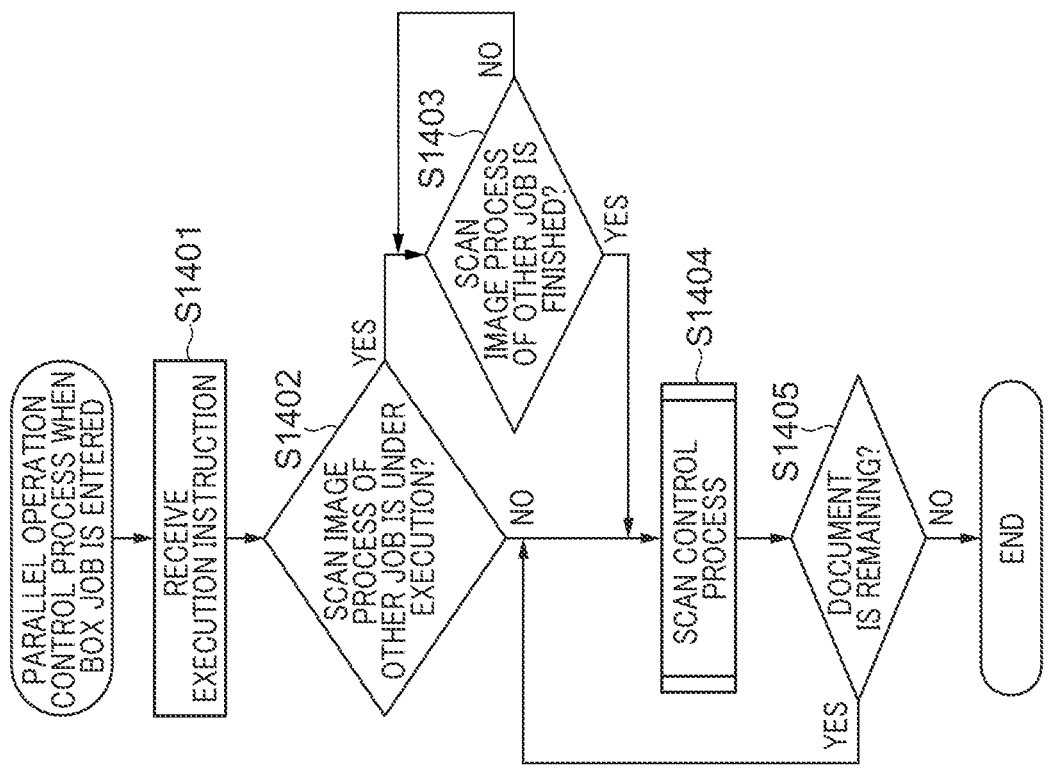
FIG. 14A is a flowchart showing procedures of a parallel operation control process executed by the MFP of FIG. 1 when a box job is entered.

FIG. 14A is a flowchart showing procedures of a parallel operation control process executed by the MFP of FIG. 1 when a box job is entered. The process of FIG. 14A is performed when the CPU 102 runs the program stored in the ROM 103 etc. The process of FIG. 14A is premised on a preceding operation of a copy job or a PDL job.

As shown in FIG. 14A, when receiving an execution instruction of a box job through the operation unit 109 (a step S1401), the CPU 102 determines whether a scan image process of another job is under execution (a step S1402).

As a result of the determination in the step S1402, when the scan image process of the other job is under execution, the CPU 102 gives priority to the execution of the scan image process of the other job and waits until the scan image process of the other job is finished (a step S1403).

When the scan image process of the other job is finished (YES in the step S1403) or when a scan image process of another job is not under execution (NO in the step S1402), the CPU 102 executes a process of a step S1404. In the step S1404, the CPU 102 executes the scan control process mentioned above on the basis of a box setting that is needed for execution of the box job. When the box job received in the step S1401 is a job that scans two or more documents, the CPU 102 performs the process of the step S1404 for every document. It should be noted that a user enters the box setting through the operation unit 109 when instructing execution of the box job in this embodiment. Next, the CPU 102 determines whether the document is remaining on the DF 200 (a step S1405).

As a result of the determination in the step S1405, when the document is remaining on the DF 200, the CPU 102 returns the process to the step S1404. As a result of the determination in the step S1405, when the document is not remaining on the DF 200, the CPU 102 finishes this process.

FIG. 14B is a flowchart showing procedures of a parallel operation control process executed by the MFP of FIG. 1 when a pull-scan job is entered. The process of FIG. 14B is performed when the CPU 102 runs the program stored in the ROM 103 etc. The process of FIG. 14B is premised on a preceding operation of a copy job or a PDL job.

As shown in FIG. 14B, when receiving an execution instruction of a pull-scan job through the operation unit 109 (a step S1406), the CPU 102 determines whether a scan image process of another job is under execution (a step S1407).

As a result of the determination in the step S1407, when the scan image process of the other job is under execution, the CPU 102 gives priority to the execution of the scan image process of the other job and waits until the scan image process of the other job is finished (a step S1408).

When the scan image process of the other job is finished (YES in the step S1408) or when a scan image process of another job is not under execution (NO in the step S1407), the CPU 102 executes a process of a step S1409. In the step S1409, the CPU 102 executes the scan control process mentioned above on the basis of a pull-scan setting obtained from the external apparatus with the transmission/reception controller 116. When the pull-scan job received in the step S1401 is a job that scans two or more documents, the CPU 102 performs the process of the step S1409 for every document. Next, the CPU 102 determines whether the document is remaining on the DF 200 (a step S1410).

As a result of the determination in the step S1410, when the document is remaining on the DF 200, the CPU 102 returns the process to the step S1409. As a result of the determination in the step S1410, when no document is remaining on the DF 200, the CPU 102 issues a transmission instruction to the transmission/reception controller 116 (a step S1411). When receiving the transmission instruction, the transmission/reception controller 116 transmits the converted image data to an external apparatus. Next, the CPU 102 finishes this process.

Figure 15:
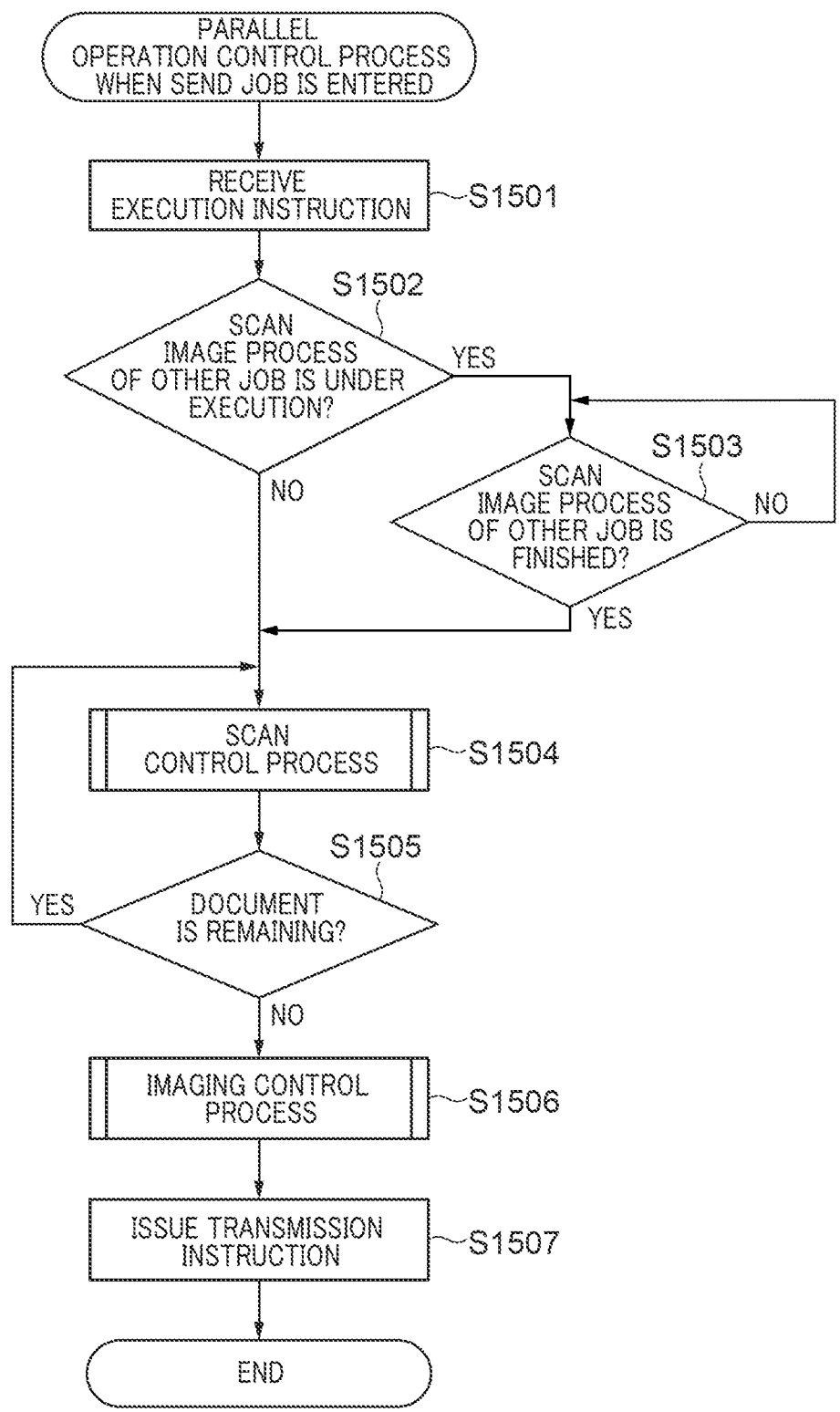
FIG. 15 is a flowchart showing procedures of a parallel operation control process executed by the MFP of FIG. 1 when a send job is entered.

FIG. 15 is a flowchart showing procedures of a parallel operation control process executed by the MFP of FIG. 1 when a send job is entered. The process of FIG. 15 is performed when the CPU 102 runs the program stored in the ROM 103 etc. The process of FIG. 15 is premised on a preceding operation of a copy job or a PDL job.

As shown in FIG. 15, when receiving an execution instruction of a send job through the operation unit 109 (a step S1501), the CPU 102 determines whether a scan image process of another job is under execution (a step S1502).

As a result of the determination in the step S1502, when the scan image process of the other job is under execution, the CPU 102 gives priority to the execution of the scan image process of the other job and waits until the scan image process of the other job is finished (a step S1503).

When the scan image process of the other job is finished (YES in the step S1503) or when a scan image process of another job is not under execution (NO in the step S1502), the CPU 102 executes a process of a step S1504. In the step S1504, the CPU 102 executes the scan control process mentioned above on the basis of the send settings input through the operation unit 109. When the send job received in the step S1501 is a job that scans two or more documents, the CPU 102 performs the process of the step S1504 for every document. Next, the CPU 102 determines whether the document is remaining on the DF 200 (a step S1505).

As a result of the determination in the step S1505, when the document is remaining on the DF 200, the CPU 102 returns the process to the step S1504. As a result of the determination in the step S1505, when no document is remaining on the DF 200, the CPU 102 executes the imaging control process mentioned above (a step S1506). Next, the CPU 102 issues a transmission instruction to the transmission/reception controller 116 (a step S1507) and finishes this process.

In this embodiment, when a copy job or a PDL job operates precedingly and a facsimile transmission job is entered afterward, the process similar to the process of FIG. 15 is performed. Specifically, when receiving an execution instruction of a facsimile transmission job through the operation unit 109, the CPU 102 executes the process of the step S1502. As a result of the determination in the step S1502, when a scan image process of another job is under execution, the CPU 102 executes the process from the step S1503. As a result of the determination in the step S1502, when a scan image process of another job is not under execution, the CPU 102 executes the scan control process mentioned above on the basis of the facsimile transmission settings input through the operation unit 109 and executes the process of the step S1505. As a result of the determination in the step S1505, when the document is remaining on the DF 200, the CPU 102 returns to the process that executes the scan control process on the basis of the facsimile transmission settings. As a result of the determination in the step S1505, when no document is remaining on the DF 200, the CPU 102 executes the facsimile transmission control process mentioned above. Next, the CPU 102 issues a facsimile transmission instruction to the transmission/reception controller 116 and finishes this process.

FIG. 16 is a flowchart showing procedures of a parallel operation control process executed by the MFP of FIG. 1 when a copy job is entered. The process of FIG. 16 is performed when the CPU 102 runs the program stored in the ROM 103 etc. The process of FIG. 16 is premised on a preceding operation of a copy job or a PDL job.

As shown in FIG. 16, when the CPU 102 receives an execution instruction of a copy job through the operation unit 109 (a step S1601), the CPU 102 executes the scan control process mentioned above on the basis of a setting input through the operation unit 109 (a step S1602). Next, the CPU 102 determines whether a print image process of the copy job of which the execution instruction is received in the step S1601 is under execution (a step S1603).

As a result of the determination in the step S1603, when the print image process of the copy job mentioned above is under execution, the CPU 102 executes a process of a step S1605 mentions later. As a result of the determination in the step S1603, when the print image process of the copy job mentioned above is not under execution, the CPU 102 determines whether a print image process of another job is executed (a step S1604).

As a result of the determination in the step S1604, when the print image process of the other job is executed, the MFP 100 cannot execute the parallel operation of the print image processes because the MFP 100 is provided with the only one printer 115. Accordingly, the CPU 102 performs a process of a step S1606 mentioned later.

As a result of the determination in the step S1604, when a print image process of another job is not executed, the print control process mentioned above is executed on the basis of the setting input through the operation unit 109 (a step S1605). When the copy job received in the step S1601 is a job that copies two or more documents, the CPU 102 performs the processes of the steps S1602 and S1603 for every document. Next, the CPU 102 determines whether the document is remaining on the DF 200 (a step S1606).

As a result of the determination in the step S1606, when the document is remaining on the DF 200, the CPU 102 returns the process to the step S1602. As a result of the determination in the step S1606, when no document is remaining on the DF 200, the CPU 102 determines whether all the pages have been printed (a step S1607).

As a result of the determination in the step S1607, when at least one page has not been printed, the CPU 102 returns the process to the step S1603. As a result of the determination in the step S1607, when all the pages have been printed, the CPU 102 finishes this process.

Figure 17B:
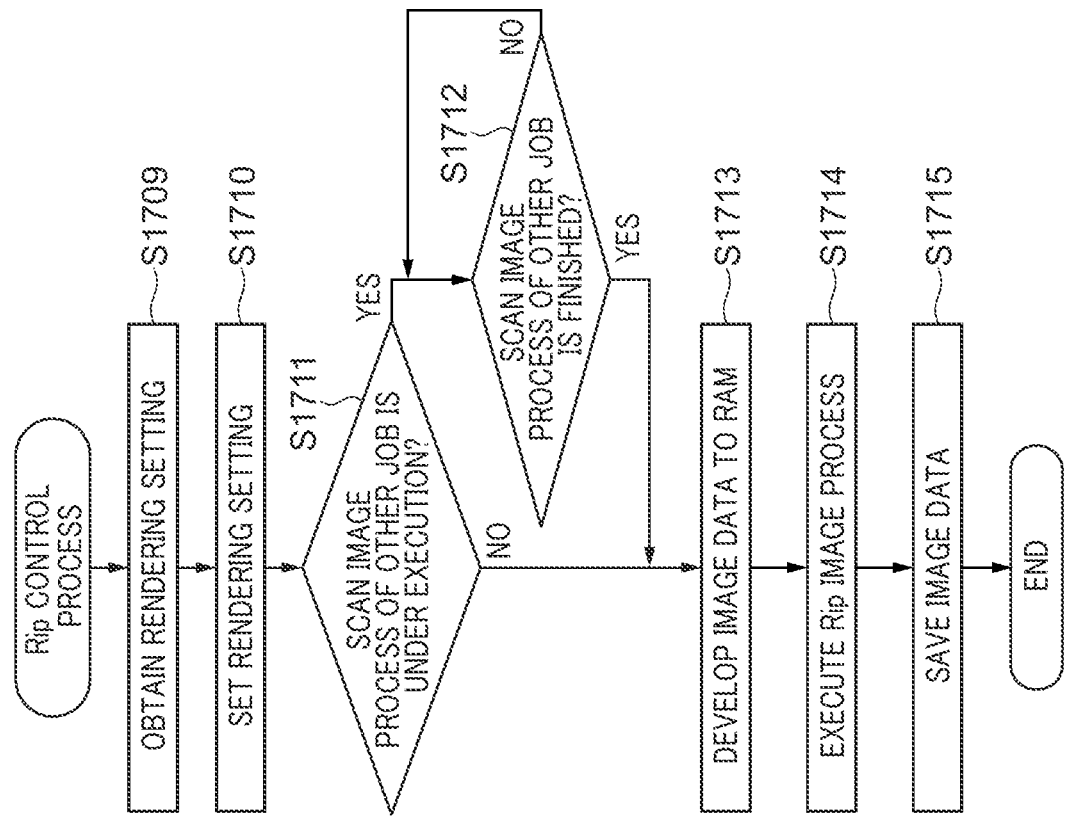
FIG. 17B is a flowchart showing procedures of a Rip control process executed in a step S1703 in FIG. 17A.
Figure 17A:
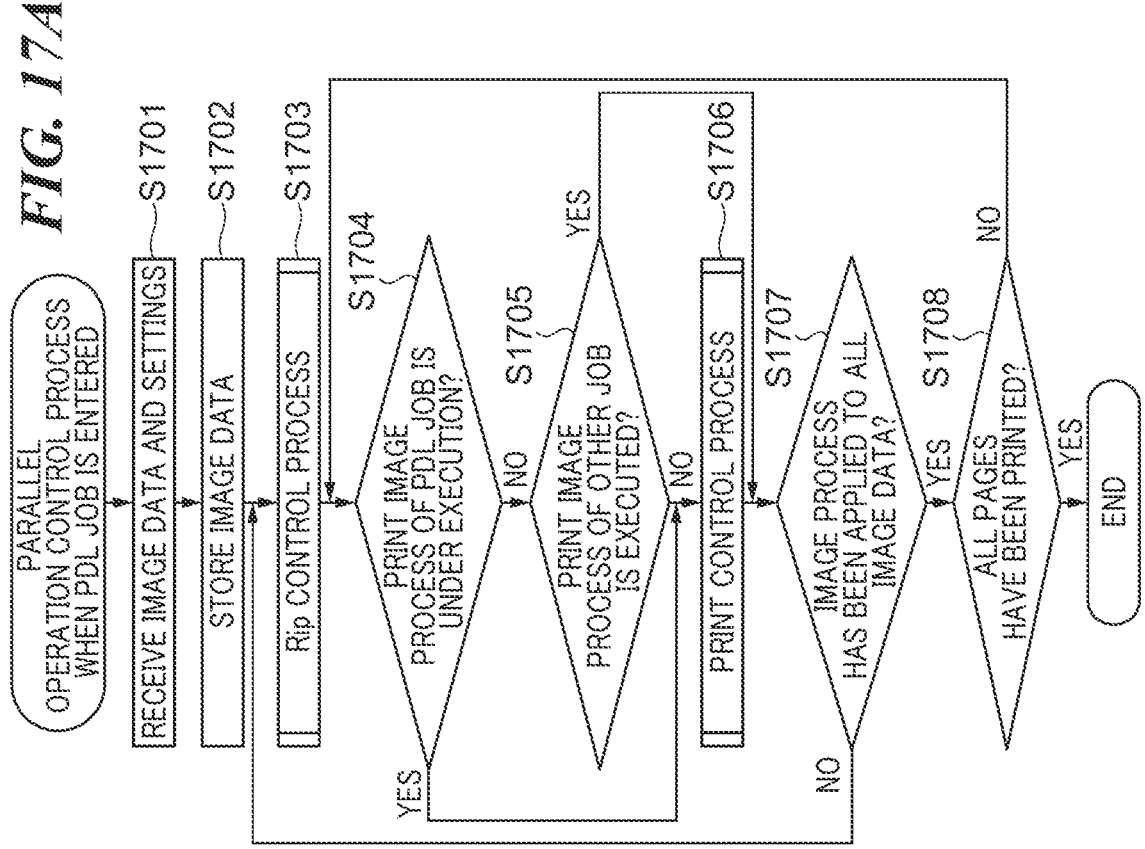
FIG. 17A is a flowchart showing procedures of a parallel operation control process executed by the MFP of FIG. 1 when a PDL job is entered.

FIG. 17A is a flowchart showing procedures of a parallel operation control process executed by the MFP of FIG. 1 when a PDL job is entered. The process of FIG. 17A is performed when the CPU 102 runs the program stored in the ROM 103 etc. It should be noted that the process of FIG. 17A is premised on a preceding operation of a copy job, a box job, a pull-scan job, a send job, or a facsimile job.

As shown in FIG. 17A, when receiving image data and settings of a PDL job with the transmission/reception controller 116 (a step S1701), the CPU 102 stores the received image data to the storage memory 105 (a step S1702). Next, the CPU 102 executes a Rip control process of FIG. 17B on the basis of the received setting (a step S1703). When a scan image process of another job is under execution at this time, the CPU 102 may give priority to the execution of the scan image process of the other job and may delay execution of the Rip control process. Next, the CPU 102 determines whether the print image process of the PDL job mentioned above is under execution (a step S1704).

As a result of the determination in the step S1704, when the print image process of the PDL job mentioned above is under execution, the CPU 102 executes a process of a step S1706 mentions later. As a result of the determination in the step S1704, when the print image process of the PDL job mentioned above is not under execution, the CPU 102 determines whether a print image process of another job is executed (a step S1705).

As a result of the determination in the step S1705, when the print image process of the other job is executed, the MFP 100 cannot execute the parallel operation of the print image processes because the MFP 100 is provided with the only one printer 115. Accordingly, the CPU 102 performs a process of a step S1707 mentioned later.

As a result of the determination in the step S1705, when a print image process of another job is not executed, the CPU 102 executes the print control process mentioned above on the received settings (the step S1706). When a plurality of image data are received in the step S1701, the CPU 102 executes the processes in the steps S1703 through S1706 for every image data. Next, the CPU 102 determines whether the image process has been applied to all the image data received in the step S1701 (the step S1707).

As a result of the determination in the step S1707, when the image process has not been applied to at least one image data, the CPU 102 returns the process to the step S1703. As a result of the determination in the step S1707, when the image process has been applied to all the image data received, the CPU 102 determines whether all the image data received in the step S1701 has been printed (a step S1708).

As a result of the determination in the step S1708, when at least one image data has not been printed, the CPU 102 returns the process to the step S1704. As a result of the determination in the step S1708, when all the image data have been printed, the CPU 102 finishes this process.

FIG. 17B is a flowchart showing procedures of the scan control process executed in the step S1703 in FIG. 17A.

As shown in FIG. 17B, the CPU 102 obtains a rendering setting from among the settings received in the step S1701 (a step S1709). Next, the CPU 102 selects the ASIC that will execute the Rip image process corresponding to the obtained rendering setting from among the ASICs 701 through 705 of the image processor 113, and sets the rendering setting to the ASIC selected (a step S1710). Next, the CPU 102 determines whether a scan image process of another job is under execution (a step S1711).

As a result of the determination in the step S1711, when the scan image process of the other job is under execution, the CPU 102 gives priority to the execution of the scan image process of the other job and waits until the scan image process of the other job is finished (a step S1712).

When the scan image process of the other job is finished (YES in the step S1712) or when a scan image process of another job is not under execution (NO in the step S1711), the CPU 102 controls as follows. That is, the CPU 102 develops the image data saved in the storage memory 105 to the RAM 104 (a step S1713). Next, the CPU 102 applies the Rip image process to the developed image data (a step S1714), saves the image data, which has been subjected to the Rip image process, to the storage memory 105 (a step S1715), and finishes this process.

The execution of the processes of FIG. 14 through FIG. 17B mentioned above enables a parallel operation of a preceding job and following job without reducing the scanning speed of the scanner 114 in the preceding job.

Next, an image processing apparatus concerning a second embodiment of the present invention will be described.

Although the second embodiment is basically identical to the first embodiment mentioned above in the configuration and effect, it differs from the first embodiment mentioned above at a point where scan related settings mentioned later are used for switch control of the transfer clock mode. Accordingly, descriptions about the duplicate configuration and effect are omitted and different configuration and effect will be described hereinafter.

FIG. 18A is a flowchart showing procedures of a scan control process executed by the MFP 100 concerning the second embodiment. The process of FIG. 18A is performed when the CPU 102 runs the program stored in the ROM 103 etc.

As shown in FIG. 18A, the CPU 102 obtains the scan related settings set through the operation unit 109 (step S1801). The scan related settings are relevant to a scan of an image of a document and include a scan color setting, a scan side setting, and a scan resolution setting, for example. The scan color setting includes a value that shows a color scan or a monochrome scan. The scan side setting includes a value that shows a double-sides scan or a single-sided scan. The scan resolution setting includes a value that shows a scan resolution like 300×300 dpi. In this embodiment, 300×300 dpi is the highest scan resolution, and, a lower scan resolution like 200×200 dpi can be set. Next, the CPU 102 selects the ASIC that will execute the scan image process corresponding to the obtained scan related settings from among the ASICs 701 through 705 of the image processor 113, and sets the scan related settings to the ASIC selected (a step S1802). Next, the CPU 102 determines whether another image process by an ASIC other than the selected ASIC is under execution or is waiting (a step S1803). Another image process is the print image process, imaging process, facsimile transmission image process, or Rip image process, for example.

As a result of the determination in the step S1803, when another image process is not under execution and is not waiting, the CPU 102 notifies the scanner 114 so as to operate in the single transfer clock mode (a step S1804). Next, the CPU 102 performs a process of a step S1808 mentioned later.

As a result of the determination in the step S1803, when the other image process is under execution or is waiting, the CPU 102 executes a switch necessity determination process of FIG. 18B mentioned later (a step S1805). Next, the CPU 102 determines the necessity of switch of the transfer speed on the basis of the result determined in the step S1805 (a step S1806).

As a result of the determination in the step S1806, when the switch of the transfer speed is unnecessary, the CPU 102 executes a process of a step S1808 mentioned later. Thereby, the CLK controller 303 maintains the preset frequency of the transfer enable clock 402 without switching the frequency. And the scanner 114 transfers image data to the controller 101 by the transfer enable clock 402 concerned. Thereby, the transfer speed is maintained at a preset transfer speed. The preset frequency is the first frequency mentioned above or a default frequency of the transfer clock 402, for example.

As a result of the determination in the step S1806, when the switch of the transfer speed is necessary, the CPU 102 notifies the scanner 114 so as to operate in the parallel transfer clock mode (a step S1807). Next, the CPU 102 receives image data from the scanner 114 (the step S1808) and applies the scan image process to the received image data with the ASIC to which the scan related settings are set (a step S1809). Next, the CPU 102 saves the image data, which has been subjected to the scan image process, in the storage memory 105 (a step S1810) and finishes this process.

FIG. 18B is a flowchart showing procedures of the switch necessity determination process executed in the step S1805 in FIG. 18A.

As shown in FIG. 18B, the CPU 102 determines whether the scan color setting is the color scan on the basis of the scan related settings obtained in the step S1801 (a step S1811).

As a result of the determination in the step S1811, the scan color setting is the color scan, the CPU 102 determines whether the scan side setting is the double-sided scan (a step S1812).

As a result of the determination in the step S1812, the scan side setting is the double-sided scan, the CPU 102 determines whether the scan resolution setting is 300×300 dpi (step S1813).

As a result of the determination in the step S1813, when the scan resolution setting is 300×300 dpi, the CPU 102 determines that the switch of the transfer speed is necessary as shown in FIG. 19 (a step S1814). When the scan related settings are predetermined settings in which the scan color setting is the color scan and the scan side setting is the double-sided scan and the scan resolution setting is 300×300 dpi, high-resolution color image data of both sides of which data amount is relatively large is transferred via the image bus 112. In such a case, when the frequency of the transfer enable clock 402 is set to the first frequency, the data transfer amount per unit time through the image bus 112 may exceed the transferable upper limit value. In light of this problem, in the embodiment, when the scan related settings are the above-mentioned predetermined settings, the CPU 102 controls the transfer speed so that the data transfer amount per unit time through the image bus 112 will not exceed the transferable upper limit value. Specifically, the CPU 102 determines that it is necessary to switch the frequency of the transfer enable clock 402 to the second frequency lower than the first frequency. Next, the CPU 102 finishes this process.

As a result of the determination in the step S1811, when the scan color setting is not the color scan, the CPU 102 determines that switch of the transfer speed is unnecessary as shown in FIG. 19 (a step S1815). Otherwise, as a result of the determination in the step S1812, when the scan side setting is not the double-sides scan, the CPU 102 determines that switch of the transfer speed is unnecessary as shown in FIG. 19 (the step S1815). Otherwise, as a result of the determination in the step S1813, the scan resolution setting is not 300×300 dpi, the CPU 102 determines that the switch of the transfer speed is unnecessary as shown in FIG. 19 (the step S1815). Next, the CPU 102 finishes this process.

According to the second embodiment mentioned above, when another image process is not under execution and is not waiting, the frequency of the transfer enable clock 402 in the scan image process is set to the first frequency. When another image process is under execution or is waiting and when the scan related settings are the predetermined settings, the frequency of the transfer enable clock 402 in the scan image process is set to the second frequency that is lower than the first frequency. Thereby, when the scan image process is executed in parallel with another image process, the data transfer amount per unit time through the image bus 112 can be controlled so as not to exceed the transferable upper limit value by the method other than the control of the scanning speed of the scanner 114. As a result, another image process is executable in parallel without reducing the scanning speed of the scanner 114.

Moreover, in the second embodiment mentioned above, the scan related settings include the scan color setting, scan side setting, and scan resolution setting. Thereby, the scan image process, which includes the settings that may cause an excess of the data transfer amount per unit time through the image bus 112 over the transferable upper limit value, is executable in parallel with another image process without reducing the scanning speed of the scanner 114.

Furthermore, in the second embodiment mentioned above, another image process is one of the print image process, imaging image process, facsimile transmission image process, and Rip image process. Thereby, the scan image process is executable in parallel with each of the above-mentioned image processes without reducing the scanning speed of the scanner 114.

Next, an image processing apparatus concerning a third embodiment of the present invention will be described.

Although the third embodiment is basically identical to each of the embodiments mentioned above in the configuration and effect, it differs from each of the embodiments mentioned above at a point where the job type is used for switch control of the transfer clock mode. Accordingly, descriptions about the duplicate configuration and effect are omitted and different configuration and effect will be described hereinafter.

Figure 20B:
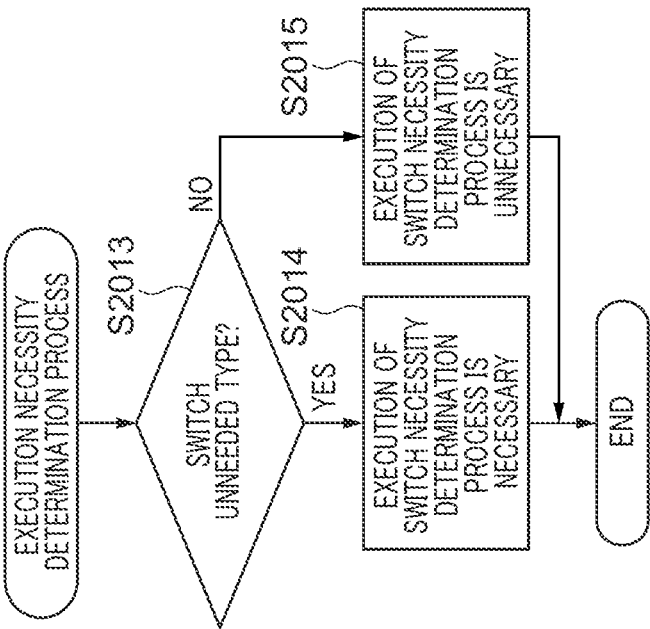
FIG. 20B is a flowchart showing procedures of an execution necessity determination process executed in a step S2005 in FIG. 20A.
Figure 20A:
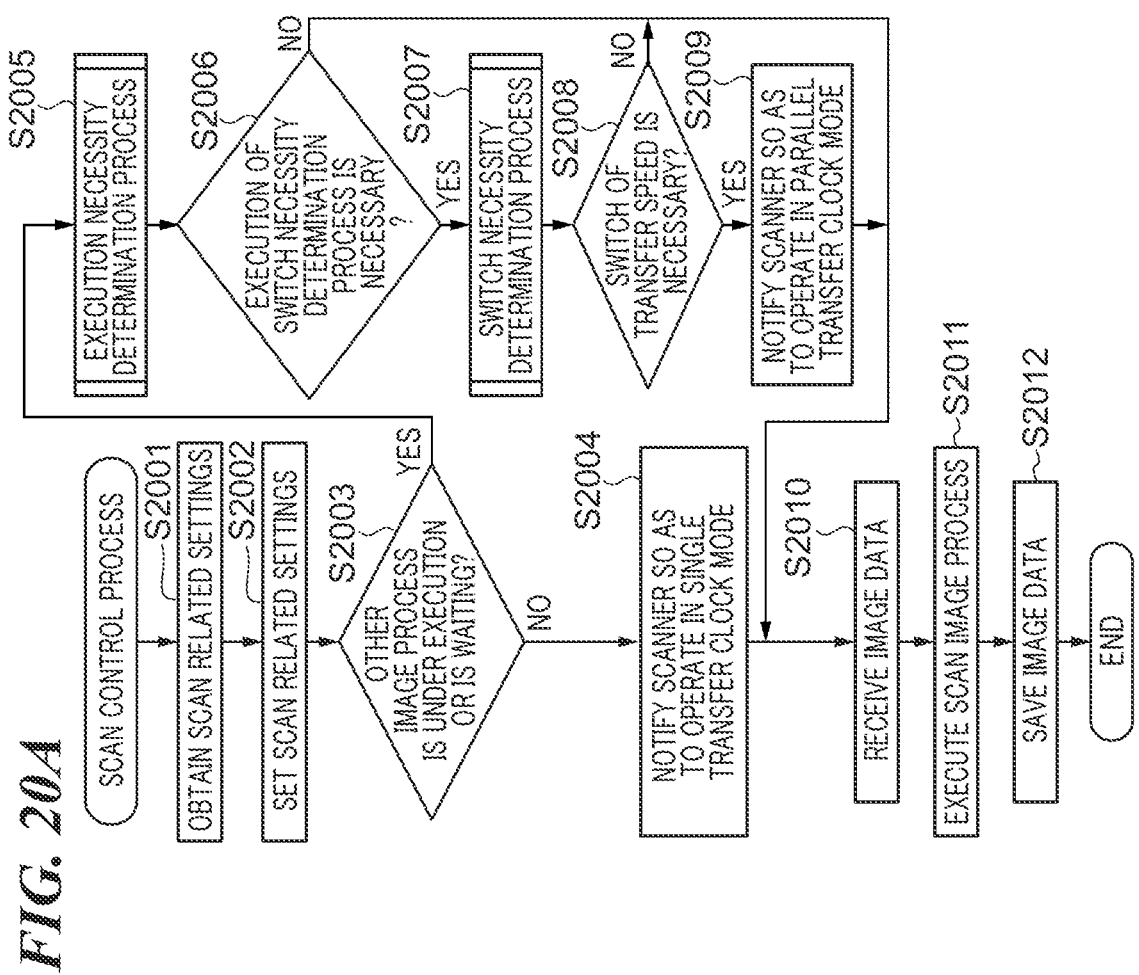
FIG. 20A is a flowchart showing procedures of a scan control process executed by an MFP concerning a third embodiment.

FIG. 20A is a flowchart showing procedures of a scan control process executed by the MFP 100 concerning the third embodiment. The process of FIG. 20A is performed when the CPU 102 runs the program stored in the ROM 103 etc. The process of FIG. 20A is executed when an execution instruction of a job is received.

As shown in FIG. 20A, the CPU 102 obtains the scan related settings set through the operation unit 109 (a step S2001). Next, the CPU 102 selects the ASIC that will execute the scan image process corresponding to the obtained scan related settings from among the ASICs 701 through 705 of the image processor 113, and sets the scan related settings to the ASIC selected (a step S2002). Next, the CPU 102 determines whether another image process by an ASIC other than the selected ASIC is under execution or is waiting (a step S2003).

As a result of the determination in the step S2003, when another image process is not under execution and is not waiting, the CPU 102 notifies the scanner 114 so as to operate in the single transfer clock mode (a step S2004). Next, the CPU 102 performs a process of a step S2010 mentioned later.

As a result of the determination in the step S2003, when the other image process is under execution or is waiting, the CPU 102 executes an execution necessity determination process of FIG. 20B mentioned later (a step S2005). Next, the CPU 102 determines the necessity of execution of the switch necessity determination process on the basis of the result determined in the step S2005 (a step S2006).

As a result of the determination in the step S2006, when execution of the switch necessity determination process is necessary, the CPU 102 executes the switch necessity determination process of FIG. 18B mentioned above (a step S2007). Next, the CPU 102 determines the necessity of switch of the transfer speed on the basis of the result determined in the step S2007 (a step S2008).

When switch of the transfer speed is unnecessary as a result of the determination in the step S2008, or when execution of the switch necessity determination process is unnecessary as a result of the determination in the step S2006, the CPU 102 executes the process of a step S2010 mentioned later. Thereby, the CLK controller 303 maintains the preset frequency of the transfer enable clock 402 without switching the frequency. And the scanner 114 transfers image data to the controller 101 by the transfer enable clock 402 concerned. Thereby, the transfer speed is maintained at a preset transfer speed. The preset frequency is the first frequency mentioned above or a default frequency of the transfer clock 402, for example.

As a result of the determination in the step S2008, when switch of the transfer speed is necessary, the CPU 102 notifies the scanner 114 so as to operate in the parallel transfer clock mode (a step S2009). Next, the CPU 102 receives image data from the scanner 114 (the step S2010) and applies the scan image process to the received image data with the ASIC to which the scan related settings are set (a step S2011). Next, the CPU 102 saves the image data, which has been subjected to the scan image process, in the storage memory 105 (a step S2010) and finishes this process.

FIG. 20B is a flowchart showing procedures of the switch necessity determination process executed in the step S2005 in FIG. 20A.

As shown in FIG. 20B, the CPU 102 determines whether the type of the received job is a predetermined type (hereinafter referred to as a "switch unneeded type") that does not need to switch the transfer speed (a step S2013). Specifically, the copy job, box job, and facsimile transmission job among the jobs shown in FIG. 13A belong to the switch unneeded type as shown in FIG. 21. In the embodiment, the scan related settings are not set to the above-mentioned predetermined settings in the copy job, box job, and facsimile transmission job. Accordingly, even if an image process constituting the copy job, box job, or facsimile transmission job is operated in parallel with a scan image process, the data transfer amount per unit time through the image bus 112 does not exceed the transferable upper limit value. In the meantime, the scan related settings may be set to the above-mentioned predetermined settings in the send job and pull-scan job among the jobs shown in FIG. 13A. Accordingly, when an image process constituting the send job or pull-scan job is operated in parallel with a scan image process, the data transfer amount per unit time through the image bus 112 may exceed the transferable upper limit value. In the embodiment, the processes of the steps S2007 and S2008 are executed only for the job type that may cause an excess of the data transfer amount per unit time through the image bus 112 over the transferable upper limit value among the jobs shown in FIG. 13A.

As a result of the determination in the step S2013, the type of the received job is the switch unneeded type, the CPU 102 determines that execution of the switch necessity determination process is unnecessary (a step S2014), and finishes this process.

As a result of the determination in the step S2013, when the type of the received job is not the switch unneeded type, the CPU 102 determines that execution of the switch necessity determination process is necessary (a step S2015), and finishes this process.

In the third embodiment mentioned above, when another image process is not under execution and is not waiting, the frequency of the transfer enable clock 402 in the scan image process is set to the first frequency. When another image process is under execution or is waiting, when the type of the received job is not the switch unneeded type, and when the scan related settings are the predetermined settings, the frequency of the transfer enable clock 402 in the scan image process is set to the second frequency that is lower than the first frequency. Thereby, when the scan image process is executed in parallel with another image process, the data transfer amount per unit time through the image bus 112 can be controlled so as not to exceed the transferable upper limit value by the method other than the control of the scanning speed of the scanner 114. As a result, another image process is executable in parallel without reducing the scanning speed of the scanner 114.

Moreover, in the third embodiment mentioned above, when the type of the received job is the switch unneeded type, the determination by the switch necessity determination process is not performed. Thereby, when the switch control of the transfer clock mode is unnecessary, execution of the switch necessity determination process is reduced, which can reduce the process load by the switch necessity determination process concerned.

Next, an image processing apparatus concerning a fourth embodiment of the present invention will be described.

Although the fourth embodiment is basically identical to each of the embodiments mentioned above in the configuration and effect, it differs from each of the embodiments mentioned above at a point where the switch control of the transfer clock mode is performed in a job unit instead of a page unit to which the scan image process is applied. Accordingly, descriptions about the duplicate configuration and effect are omitted and different configuration and effect will be described hereinafter.

Hereinafter, a process in a case where a box job is received will be described as an example.

Figure 22A:
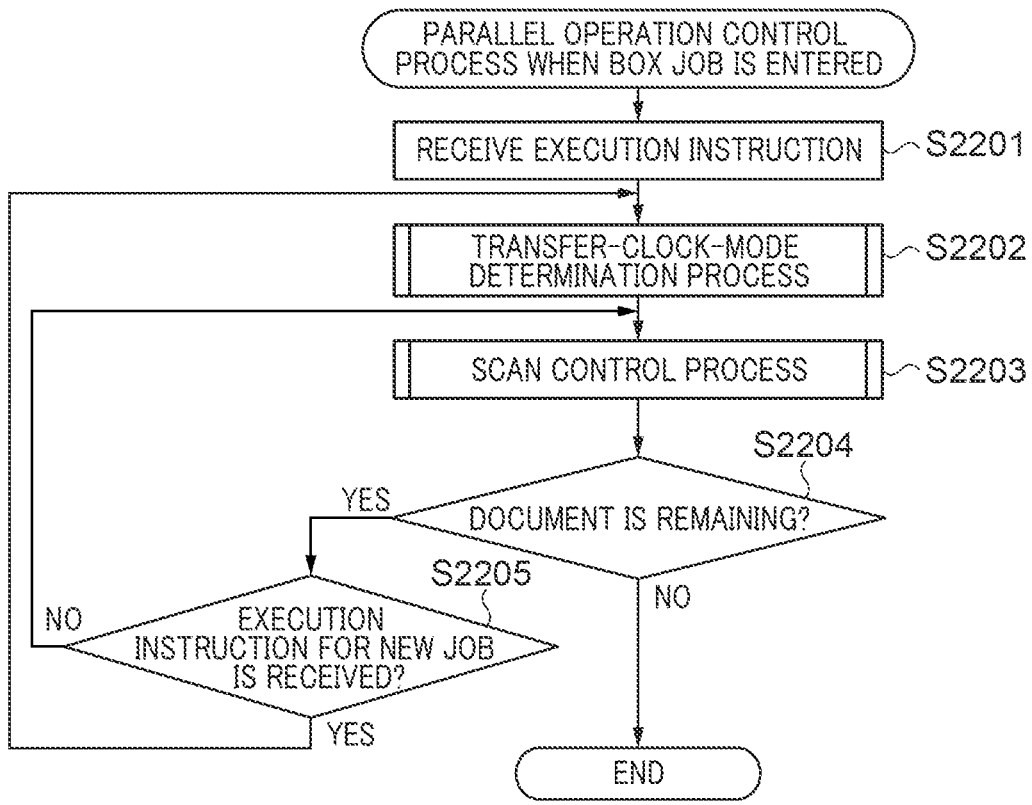
FIG. 22A is a flowchart showing procedures of a parallel operation control process executed by the MFP concerning a fourth embodiment when a box job is entered.

FIG. 22A is a flowchart showing procedures of a parallel operation control process executed by the MFP 100 concerning the fourth embodiment when a box job is entered. The process of FIG. 22A is performed when the CPU 102 runs the program stored in the ROM 103 etc.

As shown in FIG. 22A, when receiving an execution instruction of a box job through the operation unit 109 (a step S2201), the CPU 102 executes a transfer-clock-mode determination process of FIG. 22B mentioned later (a step S2202). Next, the CPU 102 executes a scan control process of FIG. 23 mentioned later on the basis of the set-up box setting and the determination by the process of the step S2202 (a step S2203). When the box job received in the step S2201 is a job that scans two or more documents, the CPU 102 performs the process of the step S2203 for every document. Next, the CPU 102 determines whether the document is remaining on the DF 200 (a step S2204).

As a result of the determination in the step S2204, when the document is not remaining on the DF 200, the CPU 102 finishes this process. As a result of the determination in the step S2204, when no document is remaining on the DF 200, the CPU 102 determines whether an execution instruction of a new job is received (a step S2205).

As a result of the determination in the step S2205, when an execution instruction for a new job is received, the CPU 102 returns the process to the step S2202. As a result of the determination in the step S2205, when an execution instruction for a new job is not received, the CPU 102 returns the process to the step S2203.

Figure 22B:
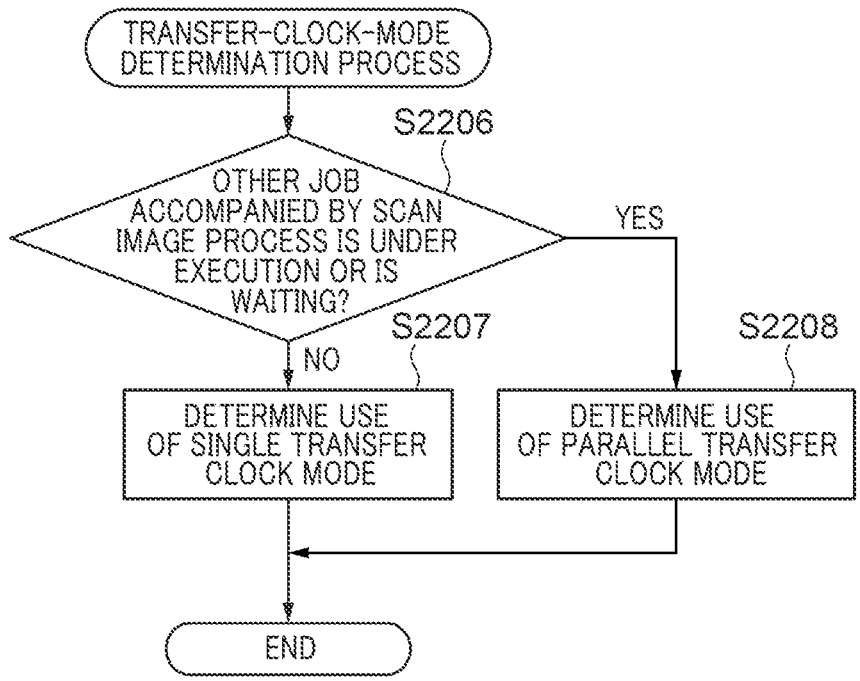
FIG. 22B is a flowchart showing procedures of a transfer clock mode determination process executed in a step S2202 in FIG. 22A.

FIG. 22B is a flowchart showing procedures of the transfer-clock-mode determination process executed in the step S2202 in FIG. 22A.

As shown in FIG. 22B, the CPU 102 determines whether another job accompanied by the scan image process is under execution or is waiting (a step S2206).

As a result of the determination in the step S2206, when another job accompanied by the scan image process is not under execution and is not waiting, the CPU 102 determines use of the single transfer clock mode (a step S2207), and finishes this process.

As a result of the determination in the step S2206, when the other job accompanied by the scan image process is under execution or is waiting, the CPU 102 determines use of the parallel transfer clock mode (a step S2208), and finishes this process.

Figure 23:
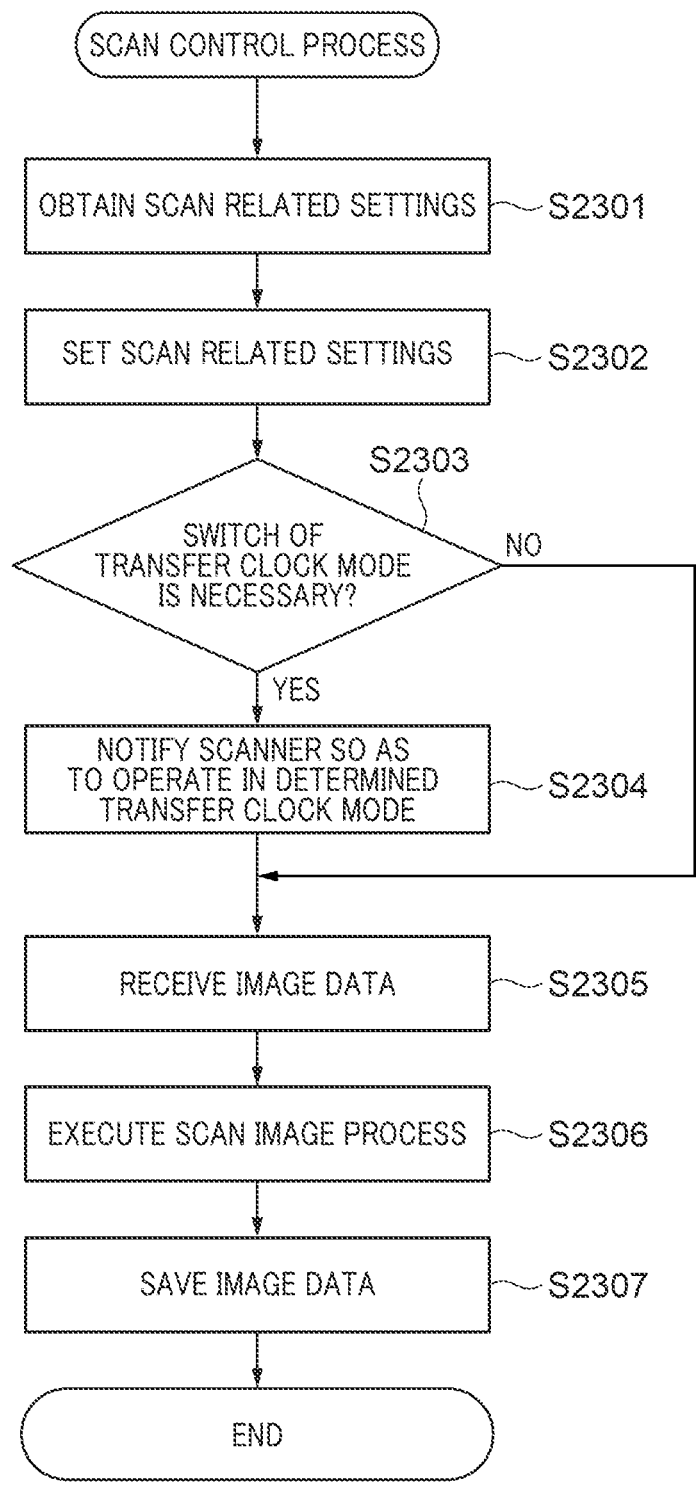
FIG. 23 is a flowchart showing procedures of a scan control process executed in a step S2203 in FIG. 22A.

FIG. 23 is a flowchart showing procedures of the scan control process executed in the step S2203 in FIG. 22A.

As shown in FIG. 23, the CPU 102 obtains the scan related settings set through the operation unit 109 (a step S2301). Next, the CPU 102 selects the ASIC that will execute the scan image process corresponding to the obtained scan related settings from among the ASICs 701 through 705 of the image processor 113, and sets the scan related settings to the ASIC selected (a step S2302). Next, the CPU 102 determines necessity of switch of the transfer clock mode on the basis of the determination by the above-mentioned transfer-clock-mode determination process (a step S2303). In the step S2303, when the transfer clock mode determined by the above-mentioned transfer-clock-mode determination process is identical to the already set-up transfer clock mode, for example, the CPU 102 determines that switch of the transfer clock mode is unnecessary. In the meantime, when the transfer clock mode determined by the above-mentioned transfer-clock-mode determination process differs from the already set-up transfer clock mode, the CPU 102 determines that switch of the transfer clock mode is necessary.

As a result of the determination in the step S2303, when the switch of the transfer speed is unnecessary, the CPU 102 executes a process of a step S2305 mentioned later. As a result of the determination in the step S2303, when the switch of the transfer clock mode is necessary, the CPU 102 notifies the scanner 114 so as to operate in the transfer clock mode determined by the above-mentioned transfer-clock-mode determination process of FIG. 22B (a step S2304). Next, the CPU 102 receives image data from the scanner 114 (a step S2305) and applies the scan image process to the received image data with the ASIC to which the scan related settings are set (a step S2306). Next, the CPU 102 saves the image data, which has been subjected to the scan image process, in the storage memory 105 (a step S2307), and finishes this process.

In the fourth embodiment mentioned above, the switch control of the transfer clock mode is performed in the job unit. That is, it is unnecessary to perform the switching process of the transfer clock mode for every scan image process of a page. Thereby, when the scan image process is executed in parallel with another image process accompanied by the scan image process, the data transfer amount per unit time through the image bus 112 can be controlled so as not to exceed the transferable upper limit value. Particularly, when the scan image process is executed in parallel with another image process, the data transfer amount per unit time through the image bus 112 in the scan image process can be controlled so as not to exceed the transferable upper limit value by the method that is other than the control of the scanning speed of the scanner 114 and reduces the load of the switching process of the transfer clock mode. As a result, another image process is executable in parallel without reducing the scanning speed of the scanner 114.

Next, an image processing apparatus concerning a fifth embodiment of the present invention will be described.

Although the fifth embodiment is basically identical to each of the embodiments mentioned above in the configuration and effect, it differs from each of the embodiments mentioned above at a point where the scan image process is executed prior to other image processes than the scan image process concerned. Accordingly, descriptions about the duplicate configuration and effect are omitted and different configuration and effect will be described hereinafter.

Hereinafter, a process in a case where a facsimile reception process consisting of the imaging process and the print image process is received will be described as an example of a job that does not include the scan image process.

Figure 24:
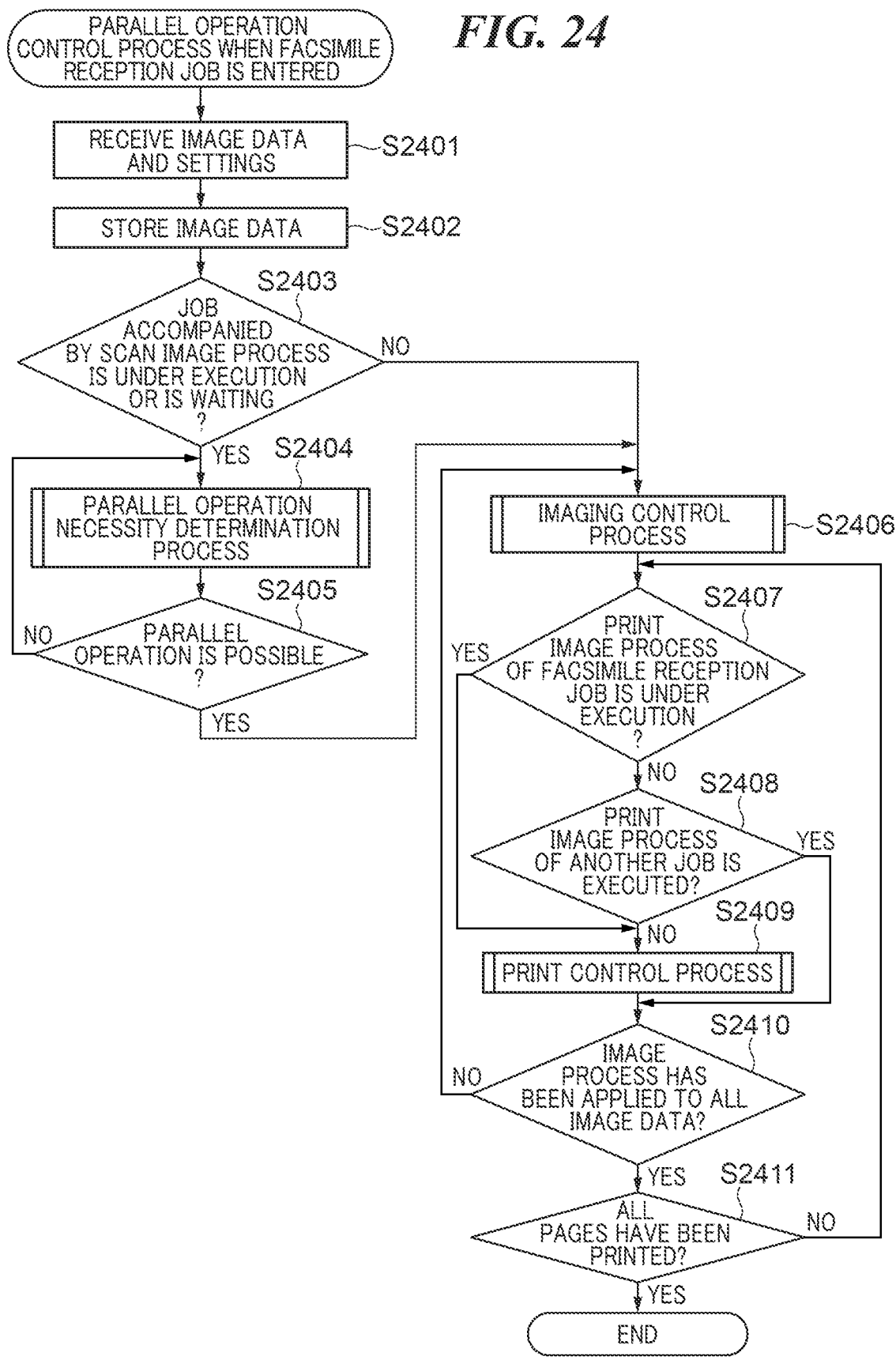
FIG. 24 is a flowchart showing procedures of a parallel operation control process executed by an MFP concerning a fifth embodiment when a facsimile reception job is entered.

FIG. 24 is a flowchart showing procedures of a parallel operation control process executed by the MFP 100 concerning the fifth embodiment when the facsimile reception job is entered.

As shown in FIG. 24, when the transmission/reception controller 116 receive image data and settings of the facsimile reception job (a step S2401), the CPU 102 saves the image data received in the step S2401 to the storage memory 105 (a step S2402). Next, the CPU 102 determines whether a job accompanied by the scan image process is under execution or is waiting (a step S2403).

As a result of the determination in the step S2403, when the job accompanied by the scan image process is under execution or is waiting, the CPU 102 executes a parallel operation necessity determination process of FIG. 25A mentioned later (a step S2404). Next, the CPU 102 determines whether the parallel operation of the received facsimile reception job and the job that is under execution or is waiting is possible on the basis of the result determined by the parallel operation determination process (a step S2405).

As a result of the determination in the step S2405, when the parallel operation is impossible, the CPU 102 returns the process to the step S2404. When the parallel operation is possible as a result of the determination in the step S2405 or when no job accompanied by the scan image process is under execution and is waiting as a result of the determination in the step S2403, the CPU 102 executes a process of a step S2406. In the step S2406, the CPU 102 executes an imaging control process of FIG. 25B mentioned later to apply the imaging process to image data. Next, the CPU 102 determines whether the print image process of the received facsimile reception job is under execution (a step S2407).

As a result of the determination in the step S2407, when the print image process of the received facsimile reception job is not under execution, the CPU 102 determines whether a print image process of another job is executed (a step S2408).

As a result of the determination in the step S2408, when the print image process of the other job is executed, the CPU 102 executes a process of a step S2410 mentions later. When the print image process of another job is not executed as a result of the determination in the step S2408 or when the print image process of the received facsimile reception job is executed as a result of the determination in the step S2407, the CPU 102 executes a process of a step S2409. In the step S2409, the CPU 102 executes a print control process of FIG. 25C mentioned later to print the image data received in the step S2401. When the received facsimile reception job is a job that receives image data of two or more pages, the CPU 102 executes the processes in the steps S2406 through S2409 for every page. Next, the CPU 102 determines whether the image process has been applied to all the image data that are a processing target (a step S2410).

As a result of the determination in the step S2410, when at least one image data that is the processing target has not been processed, the CPU 102 returns the process to the step S2406. As a result of the determination in the step S2410, when all the image data that are the processing objects have been processed, the CPU 102 determines whether all pages of the image data that are the processing target have been printed (a step S2411).

As a result of the determination in the step S2411, when at least one page of the image data has not been printed, the CPU 102 returns the process to the step S2407. As a result of the determination in the step S2411, when all the pages of the image data have been printed, the CPU 102 finishes this process.

Figure 25C:
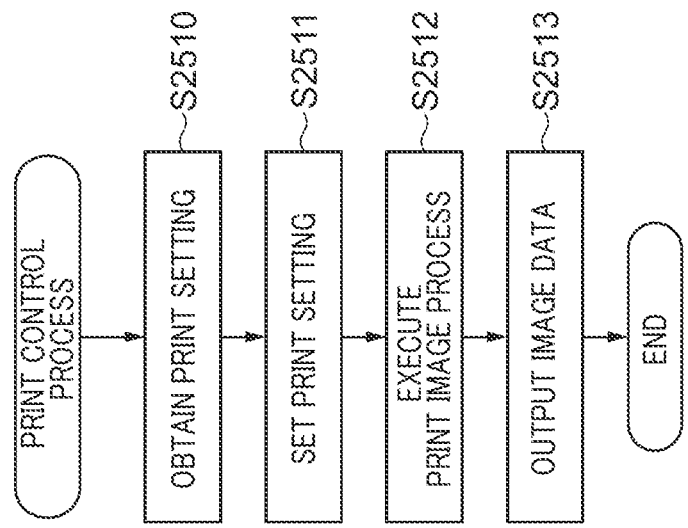
FIG. 25C is a flowchart showing procedures of a print control process executed in a step S2409 in FIG. 24.
Figure 25B:
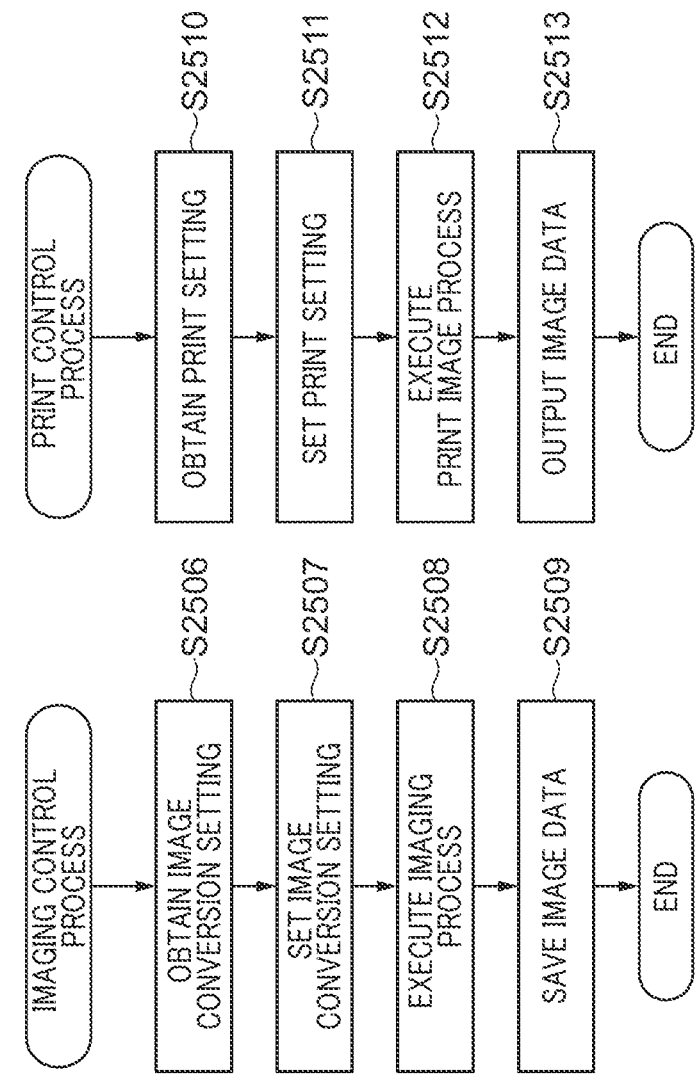
FIG. 25B is a flowchart showing procedures of an imaging control process executed in a step S2406 in FIG. 24.
Figure 25A:
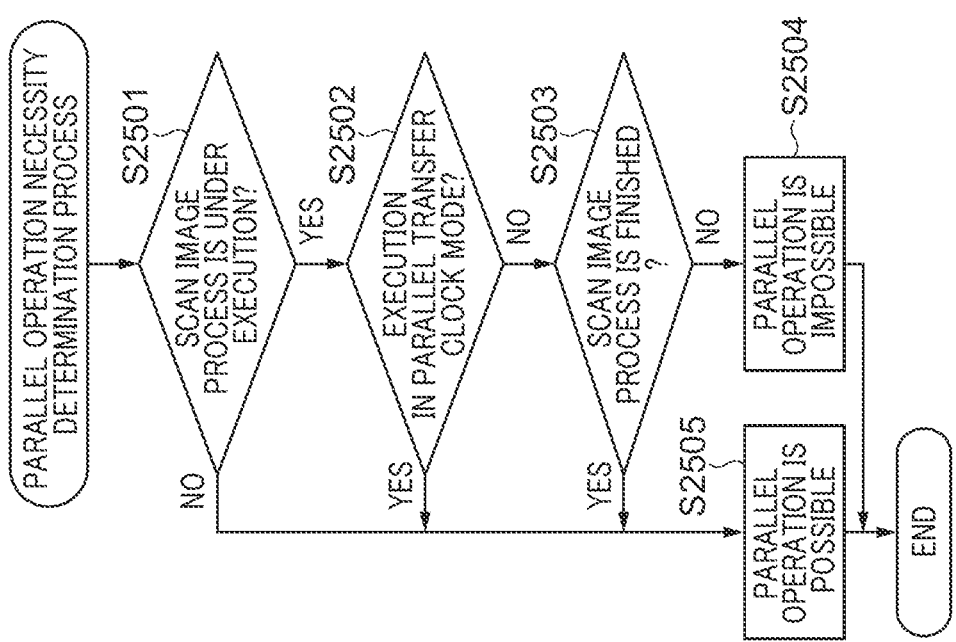
FIG. 25A is a flowchart showing procedures of a parallel operation necessity determination process executed in a step S2404 in FIG. 24.

FIG. 25A is a flowchart showing procedures of the parallel operation necessity determination process executed in the step S2404 in FIG. 24.

As shown in FIG. 25A, the CPU 102 determines whether the scan image process is under execution (a step S2501).

As a result of the determination in the step S2501, when the scan image process is under execution, the CPU 102 determines whether the scan image process concerned is executed in the parallel transfer clock mode (a step S2502).

As a result of the determination in the step S2502, when the above-mentioned scan image process is not executed in the parallel transfer clock mode, the CPU 102 determines whether the above-mentioned scan image process is finished (a step S2503).

As a result of the determination in the step S2503, when the above-mentioned scan image process is not finished, the CPU 102 determines that the parallel operation is impossible (a step S2504) and finishes this process.

As a result of the determination in the step S2503, when the above-mentioned scan image process is finished, the CPU 102 determines that the parallel operation is possible (a step S2505) and finishes this process. Otherwise, as a result of the determination in the step S2502, when the above-mentioned scan image process is executed in the parallel transfer clock mode, the CPU 102 determines that the parallel operation is possible (the step S2505) and finishes this process. Otherwise, as a result of the determination in the step S2501, when the scan image process is not under execution, the CPU 102 determines that the parallel operation is possible (the step S2505) and finishes this process.

FIG. 25B is a flowchart showing procedures of the imaging control process executed in the step S2406 in FIG. 24.

As shown in FIG. 25B, the CPU 102 obtains an image conversion setting among the settings received in the step S2401 (a step S2506). Next, the CPU 102 selects the ASIC that will execute the imaging process according to the obtained image conversion setting from among the ASICs 701 through 705 of the image processor 113, and sets the image conversion setting to the ASIC selected (a step S2507). Next, the CPU 102 applies the imaging process to the image data saved in the storage memory 105 (a step S2508), saves the image data, which has been subjected to the imaging process, to the storage memory 105 (a step S2509), and finishes this process.

FIG. 25C is a flowchart showing procedures of the print control process executed in the step S2409 in FIG. 24.

As shown in FIG. 25C, the CPU 102 obtains a print setting among the settings received in the step S2401 (a step S2510). Next, the CPU 102 selects the ASIC that will execute the print image process corresponding to the obtained print setting from among the ASICs 701 through 705 of the image processor 113, and sets the print setting to the ASIC selected (a step S2511). Next, the CPU 102 applies the print image process to the image data saved in the storage memory 105 (a step S2512). Next, the CPU 102 outputs the image data, which has been subjected to the print image process, to the printer 115 (a step S2513). The printer 115 prints the image data obtained onto a recording sheet. Next, the CPU 102 finishes this process.

In the fifth embodiment mentioned above, even when the scan image process is executed prior to other image processes than the scan image process concerned, the switch control of the transfer clock mode is performed in the job unit. That is, it is unnecessary to perform the switching process of the transfer clock mode for every scan image process of a document. Thereby, when a job accompanied by the scan image process is executed in parallel with another image process, the data transfer amount per unit time through the image bus 112 can be controlled so as not to exceed the transferable upper limit value. Particularly, when the scan image process is executed in parallel with another image process, the data transfer amount per unit time through the image bus 112 in the scan image process can be controlled so as not to exceed the transferable upper limit value by the method that is other than the control of the scanning speed of the scanner 114 and reduces the load of the switching process of the transfer clock mode. As a result, another image process is executable in parallel without reducing the scanning speed of the scanner 114.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-229369, filed Dec. 19, 2019, which is hereby incorporated by reference herein in its entirety.

What is claimed is:

1. An image processing apparatus comprising:
a scanner that scans an image of a document and generates image data;
an image processor that applies an image process to image data;
a scanner controller that transfers image data to the image processor from the scanner through a data bus; and
a controller configured to:
determine whether a first image process applied to the image data generated by the scanner is executed in parallel with a second image process that differs from the first image process;
determine whether a setting about the first image process is a predetermined setting;
set a transfer speed of image data by the scanner controller to a first transfer speed in a case where it is determined that the first image process is not executed in parallel with the second image process; and
set the transfer speed to a second transfer speed that is lower than the first transfer speed in a case where it is determined that the first image process is executed in parallel with the second image process and where the setting about the first image process is the predetermined setting.

2. The image processing apparatus according to claim 1, wherein the setting about the first image process is a scan related setting relevant to a scan of the image of the document.

3. The image processing apparatus according to claim 2, wherein the scan related setting includes a scan color setting, a scan side setting, or a scan resolution setting.

4. The image processing apparatus according to claim 1, wherein the predetermined setting may cause an excess of a data transfer amount per unit time through the image over a predetermined amount.

5. The image processing apparatus according to claim 1, wherein the controller is configured to:
determine a type of a job accompanied by execution of the second image process is a predetermined type; and
maintain the transfer speed at a preset transfer speed without determining whether the setting about the first image process is the predetermined setting in a case where the type of the job is the predetermined type.

6. The image processing apparatus according to claim 5, wherein a copy job, a box job, and a facsimile transmission job belong to the predetermined type.

7. The image processing apparatus according to claim 1, wherein the second image process is one of a print image process, an imaging process, a facsimile transmission image process, and a Rip image process.

8. A control method for an image processing apparatus including a scanner that scans an image of a document and generates image data, an image processor that applies an image process to image data, and a scanner controller that transfers image data to the image processor from the scanner through a data bus, the control method comprising:
determining whether a first image process applied to the image data generated by the scanner is executed in parallel with a second image process that differs from the first image process;
determining whether a setting about the first image process is a predetermined setting;
setting a transfer speed of image data by the scanner controller to a first transfer speed in a case where it is determined that the first image process is not executed in parallel with the second image process; and
setting the transfer speed to a second transfer speed that is lower than the first transfer speed in a case where it is determined that the first image process is executed in parallel with the second image process and where the setting about the first image process is the predetermined setting.

9. A non-transitory computer-readable storage medium storing a control program causing a computer to execute a control method for an image processing apparatus including a scanner that scans an image of a document and generates image data, an image processor that applies an image process to image data, and a scanner controller that transfers image data to the image processor from the scanner through a data bus, the control method comprising:
determining whether a first image process applied to the image data generated by the scanner is executed in parallel with a second image process that differs from the first image process;
determining whether a setting about the first image process is a predetermined setting;
setting a transfer speed of image data by the scanner controller to a first transfer speed in a case where it is determined that the first image process is not executed in parallel with the second image process; and
setting the transfer speed to a second transfer speed that is lower than the first transfer speed in a case where it is determined that the first image process is executed in parallel with the second image process and where the setting about the first image process is the predetermined setting.

* * * * *